(12) United States Patent
Kusakari et al.

(10) Patent No.: US 11,417,899 B2
(45) Date of Patent: Aug. 16, 2022

(54) FUEL CELL SYSTEM

(71) Applicant: TOYOTA JIDOSHA KABUSHIKI KAISHA, Toyota (JP)

(72) Inventors: Toshiaki Kusakari, Sunto-gun (JP); Masaaki Matsusue, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 153 days.

(21) Appl. No.: 17/022,811

(22) Filed: Sep. 16, 2020

(65) Prior Publication Data

US 2021/0175525 A1    Jun. 10, 2021

(30) Foreign Application Priority Data

Dec. 4, 2019 (JP) .............................. JP2019-219705

(51) Int. Cl.
*H01M 8/04* (2016.01)
*H01M 8/04119* (2016.01)
*B60L 58/30* (2019.01)
*H01M 8/04082* (2016.01)
*H01M 8/04223* (2016.01)

(52) U.S. Cl.
CPC ......... *H01M 8/04164* (2013.01); *B60L 58/30* (2019.02); *H01M 8/04201* (2013.01); *H01M 8/04253* (2013.01); *H01M 2250/20* (2013.01)

(58) Field of Classification Search
CPC ......... H01M 8/04164; H01M 8/04201; H01M 8/04253; B60L 58/30
USPC .......................................................... 429/428
See application file for complete search history.

(56) References Cited

U.S. PATENT DOCUMENTS

| 2009/0087699 A1 | 4/2009 | Takemoto et al. |
| 2019/0252701 A1* | 8/2019 | Okamura .......... H01M 8/04164 |
| 2019/0288309 A1* | 9/2019 | Saitoh .................... G01S 13/58 |

FOREIGN PATENT DOCUMENTS

| JP | 2007-026892 A | 2/2007 |
| JP | 2008-262735 A | 10/2008 |
| JP | 2009-087858 A | 4/2009 |
| JP | 2009-193781 A | 8/2009 |

* cited by examiner

*Primary Examiner* — James M Erwin
(74) *Attorney, Agent, or Firm* — Finnegan, Henderson, Farabow, Garrett & Dunner, LLP

(57) ABSTRACT

A fuel cell system to be mounted on a vehicle includes a fuel cell configured to generate electric power through chemical reaction of reactive gases, a gas-liquid separator configured to separate water from an off-gas discharged from the fuel cell and store the separated water, a discharge valve configured to drain the water flowing out through an opening at a bottom of the gas-liquid separator, an attitude control device configured to control an attitude of the gas-liquid separator relative to the vehicle, and an instruction device configured to send an instruction for a control target of the attitude of the gas-liquid separator to the attitude control device.

11 Claims, 15 Drawing Sheets

FUEL CELL SYSTEM

INCORPORATION BY REFERENCE

The disclosure of Japanese Patent Application No. 2019-219705 filed on Dec. 4, 2019 including the specification, drawings and abstract is incorporated herein by reference in its entirety.

BACKGROUND

1. Technical Field

The present disclosure relates to a fuel cell system.

2. Description of Related Art

A gas-liquid separator separates water from an anode off-gas discharged from a fuel cell, and stores the separated water (for example, Japanese Unexamined Patent Application Publication No. 2008-262735 (JP 2008-262735 A) and Japanese Unexamined Patent Application Publication No. 2009-87858 (JP 2009-87858 A)). An opening is provided at the bottom of the gas-liquid separator. The opening is connected to a discharge valve via a discharge pipe. When the discharge valve is opened, the water stored in the gas-liquid separator is drained.

SUMMARY

The water in the gas-liquid separator does not always accumulate at a position appropriate for draining. For example, in a fuel cell system mounted on a fuel cell vehicle, the water in the gas-liquid separator moves in a direction opposite to an acceleration direction and accumulates unevenly during acceleration of the fuel cell vehicle. Therefore, there is a possibility that the water is not smoothly drained because the water is located away from the opening. When the amount of saturated vapor decreases along with a decrease in temperature while the fuel cell vehicle is parked, water vapor in the gas-liquid separator is condensed into water and accumulates at the bottom in a vertical direction. The water flows into the discharge valve through the opening. When the temperature further decreases to a temperature below a freezing point, there is a possibility that the water cannot be drained because the discharge valve is frozen.

The present disclosure provides a fuel cell system in which the position of water in a gas-liquid separator can be adjusted.

A fuel cell system to be mounted on a vehicle according to one aspect of the present disclosure includes a fuel cell, a gas-liquid separator, a discharge valve, an attitude control device, and an instruction device. The fuel cell is configured to generate electric power through chemical reaction of reactive gases. The gas-liquid separator is configured to separate water from an off-gas discharged from the fuel cell and store the water that is separated. The discharge valve is configured to drain the water that has flowed out through an opening at a bottom of the gas-liquid separator. The attitude control device is configured to control an attitude of the gas-liquid separator relative to the vehicle. The instruction device is configured to send an instruction for a control target of the attitude of the gas-liquid separator to the attitude control device.

According to the structure described above, the gas-liquid separator separates the water from the off-gas discharged from the fuel cell, and stores the separated water. The water flowing out through the opening at the bottom can be drained through the discharge valve. The attitude control device controls the attitude of the gas-liquid separator relative to the vehicle. The instruction device sends the instruction for the control target of the attitude of the gas-liquid separator to the attitude control device. The instruction device can adjust the position of the water in the gas-liquid separator based on the control target of the attitude of the gas-liquid separator.

In the structure described above, the attitude control device may be configured to control a first angle of the gas-liquid separator with respect to a fore-and-aft direction of the vehicle such that the first angle reaches a target value of the first angle, and control a second angle of the gas-liquid separator with respect to a lateral direction of the vehicle such that the second angle reaches a target value of the second angle. The instruction device may be configured to send instructions for the target value of the first angle and the target value of the second angle as the control target of the attitude of the gas-liquid separator.

In the structure described above, the fuel cell system may further include an acceleration sensor configured to detect an acceleration of the vehicle. The instruction device may be configured to determine the control target of the attitude of the gas-liquid separator based on the acceleration and a gravitational acceleration such that the opening of the gas-liquid separator is inclined in an acceleration direction of the vehicle.

In the structure described above, the instruction device may be configured to calculate a resultant force of a gravity and a reaction force against an acceleration force of the acceleration, and determine the control target of the attitude of the gas-liquid separator such that a direction of the resultant force with respect to the fore-and-aft direction of the vehicle coincides with a direction orthogonal to a plane of the opening through which the water flows out.

In the structure described above, the instruction device may be configured to determine, when the instruction device estimates that a temperature in the gas-liquid separator changes to a temperature below a freezing point while the fuel cell stops generating the electric power, the control target of the attitude of the gas-liquid separator such that the water does not flow out through the opening of the gas-liquid separator.

In the structure described above, the gas-liquid separator may have a water storage area where the water is allowed to be stored without flowing out through the opening when the gas-liquid separator has a reference angle with respect to a vertical direction. The instruction device may be configured to determine, when the instruction device estimates that a temperature in the gas-liquid separator changes to a temperature below a freezing point while the fuel cell stops generating the electric power, the control target of the attitude of the gas-liquid separator such that the gas-liquid separator has the reference angle with respect to the vertical direction.

In the structure described above, the instruction device may be configured to calculate an amount of the water in the gas-liquid separator, and determine, when the amount of the water in the gas-liquid separator is equal to or smaller than a maximum water storage amount of the water storage area, the control target of the attitude of the gas-liquid separator such that the gas-liquid separator has the reference angle with respect to the vertical direction.

In the structure described above, the fuel cell system may further include a scavenging device configured to scavenge the fuel cell by sending the reactive gases. The instruction device may be configured to instruct the scavenging device to scavenge the fuel cell and open the discharge valve when the amount of the water in the gas-liquid separator is larger than the maximum water storage amount.

In the structure described above, the fuel cell system may further include an inclination sensor configured to detect an inclination of the vehicle. The instruction device may be configured to determine the control target of the attitude of the gas-liquid separator depending on the inclination of the vehicle.

In the structure described above, the instruction device may be configured to determine, when the instruction device estimates that a temperature in the gas-liquid separator does not change to a temperature below a freezing point while the fuel cell stops generating the electric power, the control target of the attitude of the gas-liquid separator such that a plane of the opening through which the water flows out is orthogonal to a vertical direction.

In the structure described above, the gas-liquid separator may include an inlet of the off-gas discharged from the fuel cell, and an outlet of the off-gas to be circulated through the fuel cell. Flexible pipes may be connected to the inlet, the outlet, and a downstream side of the discharge valve.

According to the present disclosure, water can easily be drained from the gas-liquid separator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Fuel Cell System 1

Figure 1:
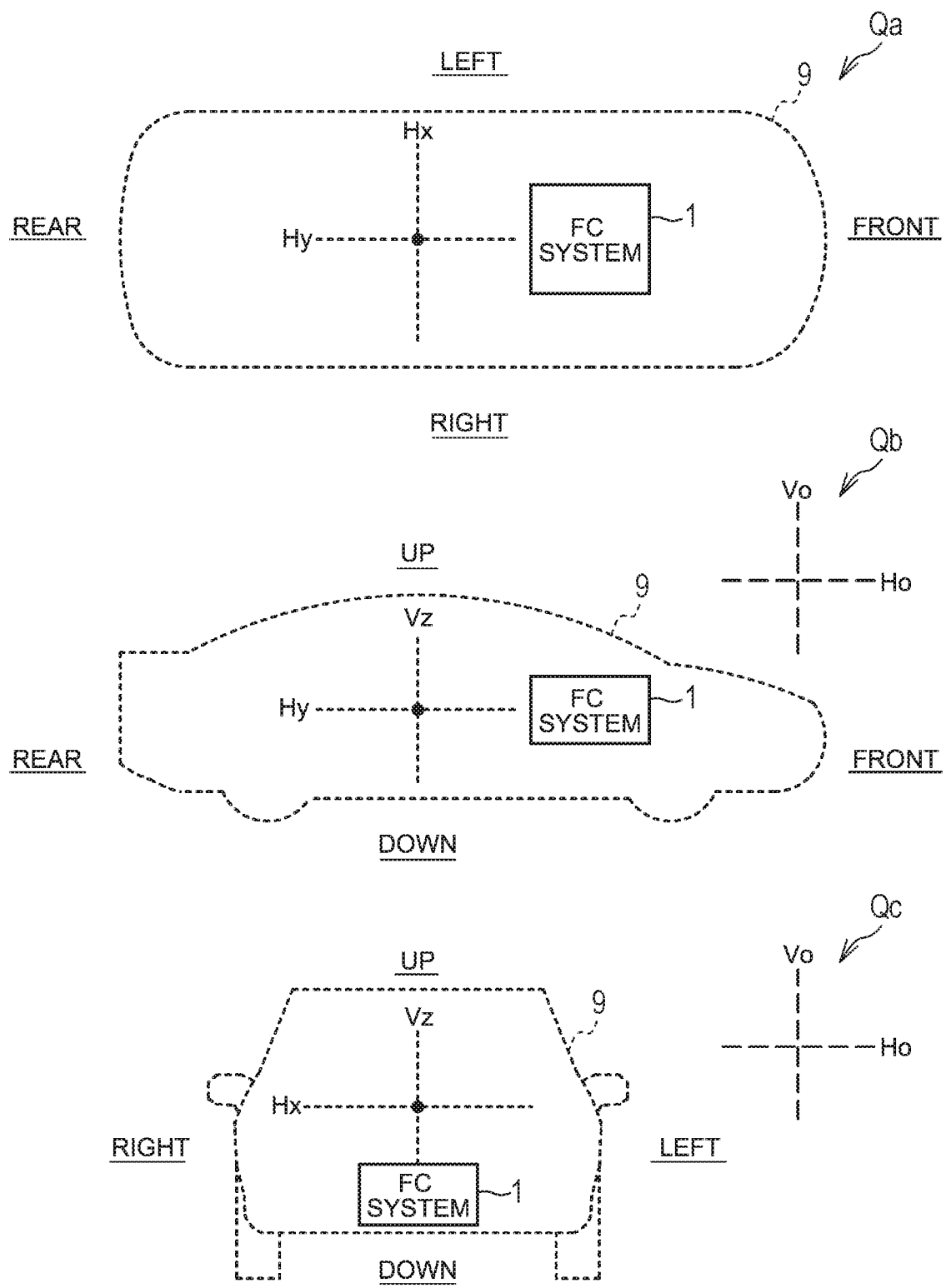
FIG. 1 is a schematic diagram illustrating an example of a fuel cell vehicle.

FIG. 1 is a schematic diagram illustrating an example of a fuel cell vehicle 9. A fuel cell system 1 is mounted on the fuel cell vehicle 9. The fuel cell system 1 generates electric power to drive wheels of the fuel cell vehicle 9. The fuel cell vehicle 9 is an example of a vehicle including the fuel cell system 1, but the vehicle is not limited to the fuel cell vehicle 9.

Reference symbol Qa represents the fuel cell vehicle 9 in top view. Reference symbol Qb represents the fuel cell vehicle 9 in side view. Reference symbol Qc represents the fuel cell vehicle 9 in front view. In the following description, an Hx axis, an Hy axis, and a Vz axis are used. The Hx axis extends in a lateral direction of the fuel cell vehicle 9. The Hy axis extends in a fore-and-aft direction of the fuel cell vehicle 9. The Vz axis extends in an up-and-down direction of the fuel cell vehicle 9. In the following description, a vertical direction Vo and a horizon plane Ho are used as well. The horizon plane Ho is orthogonal to the vertical direction Vo.

Figure 2:
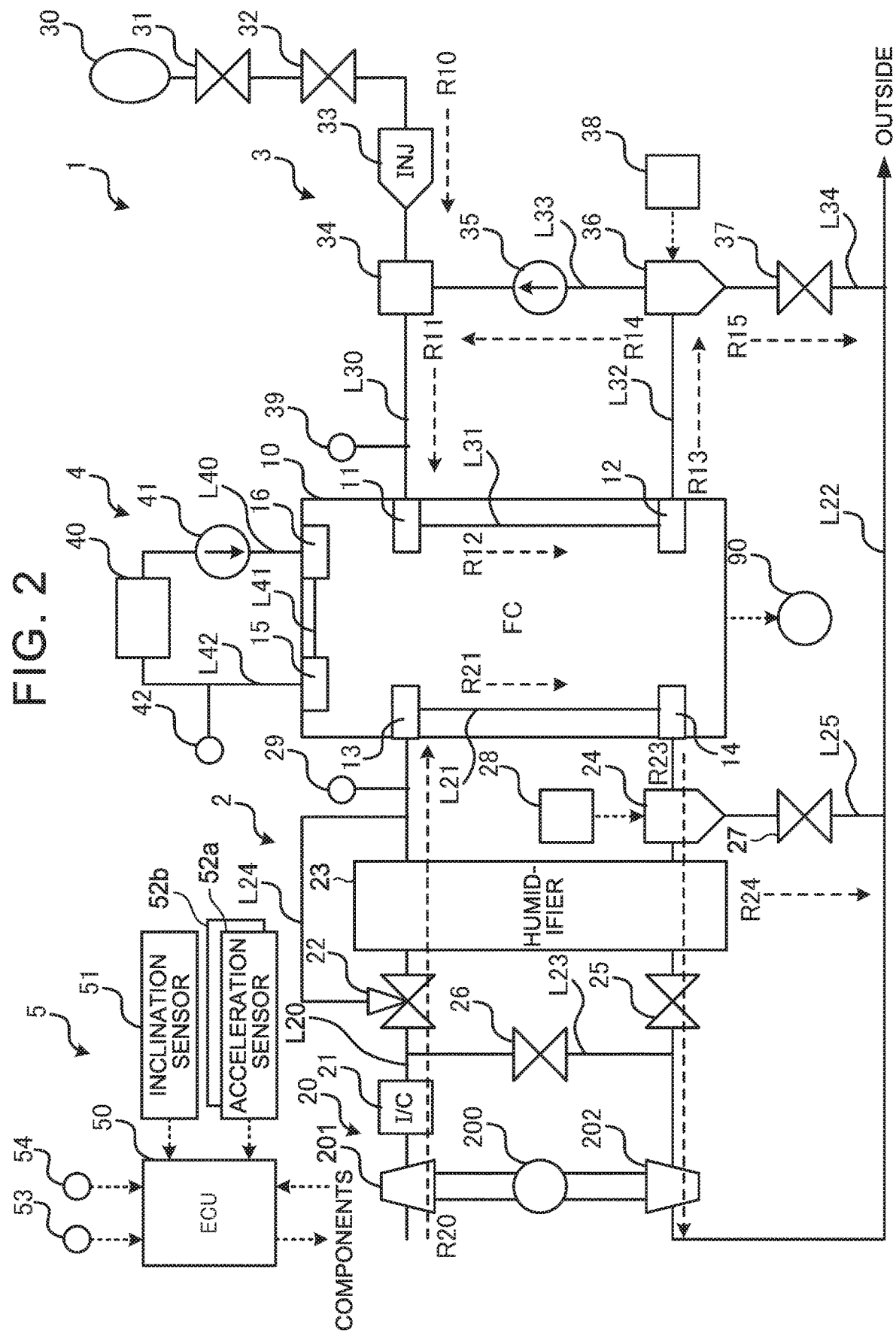
FIG. 2 is a structural diagram illustrating an example of a fuel cell system.

FIG. 2 is a structural diagram illustrating an example of the fuel cell system 1. The fuel cell system 1 includes a fuel cell (FC) 10, a motor 90, a cathode system 2, an anode system 3, a cooling system 4, and a control system 5. Illustration is omitted for an electrical structure connecting the FC 10 and the motor 90.

The FC 10 includes a stack of a plurality of polymer-electrolyte single cells. The FC 10 is supplied with a cathode gas and an anode gas, and generates electric power through chemical reaction of the cathode gas and the anode gas. In this embodiment, the cathode gas is air containing oxygen, and the anode gas is a hydrogen gas. The cathode gas and the anode gas are examples of reactive gases. The electric power generated by the FC 10 is supplied to the motor 90.

The FC 10 has an inlet 11 and an outlet 12 of the anode gas, an inlet 13 and an outlet 14 of the cathode gas, and an inlet 16 and an outlet 15 of a coolant. The inlet 11 and the outlet 12 of the anode gas are connected via an anode gas channel L31. The inlet 13 and the outlet 14 of the cathode gas are connected via a cathode gas channel L21. The inlet 16 and the outlet 15 of the coolant are connected via a coolant channel L41. Each of the anode gas channel L31, the cathode gas channel L21, and the coolant channel L41 includes a manifold passing through the stack of single cells, and grooves formed in separators of the single cells.

The cathode system 2 supplies air containing oxygen to the FC 10 as the cathode gas. For example, the cathode system 2 includes a cathode supply pipe L20, a cathode discharge pipe L22, bypass pipes L23 and L24, a cathode connection pipe L25, an air compressor 20, an intercooler (I/C) 21, a three-way valve 22, a bypass valve 26, a humidifier 23, a gas-liquid separator 24, a back pressure regulating valve 25, a cathode discharge valve 27, a pressure sensor 29, and an attitude control device 28.

The cathode gas is supplied to the FC 10 through the cathode supply pipe L20 as indicated by reference symbol R20. The cathode supply pipe L20 is provided with the air compressor 20, the intercooler 21, the three-way valve 22, the humidifier 23, and the pressure sensor 29. Both ends of the bypass pipe L24 are connected to the cathode supply pipe L20.

The air compressor 20 includes a motor 200, a compression turbine 201, and an expansion turbine 202 mechanically connected together. The motor 200 rotates the compression turbine 201 so that the cathode gas is compressed. The expansion turbine 202 is rotated by a cathode off-gas flowing through the cathode discharge pipe L22. The rotation of the expansion turbine 202 assists the rotation of the motor 200. The compressed cathode gas flows into the intercooler 21.

For example, the intercooler 21 cools the cathode gas whose temperature is increased through the compression in the air compressor 20. The cooled cathode gas flows into the humidifier 23 and the bypass pipe L24 through the three-way valve 22. At this time, the flow rates in the humidifier 23 and the bypass pipe L24 change depending on the opening degrees of the three-way valve 22.

The humidifier 23 humidifies the cathode gas flowing into the humidifier 23 through the three-way valve 22. The cathode gas flowing into the bypass pipe L24 bypasses the humidifier 23, joins the humidified cathode gas at a downstream side of the humidifier 23, and flows into the FC 10 through the inlet 13. The pressure sensor 29 detects a pressure of the cathode gas at the inlet 13 of the FC 10. The cathode gas in the FC 10 flows through the cathode channel as indicated by reference symbol R21. The FC 10 discharges the cathode gas used in electric power generation as a cathode off-gas into the cathode discharge pipe L22 through the outlet 14. The cathode off-gas is an example of an off-gas.

As indicated by reference symbol R23, the cathode off-gas flows through the cathode discharge pipe L22 from the outlet 14 of the FC 10, and is discharged to the outside of the fuel cell vehicle 9. The cathode discharge pipe L22 is provided with the gas-liquid separator 24, the humidifier 23, the back pressure regulating valve 25, and the air compressor 20. One end of the cathode connection pipe L25 is connected to the cathode discharge pipe L22.

The gas-liquid separator 24 separates water from the cathode off-gas, and stores the separated water. For example, moisture added in the humidifier 23 and moisture generated through power generating reaction are mixed as water in the cathode off-gas. Using a difference between the specific gravities of the cathode off-gas and the water, the gas-liquid separator 24 stores the water having a greater specific gravity on a lower side in the vertical direction. The cathode off-gas separated from the water by the gas-liquid separator 24 flows into the humidifier 23.

The humidifier 23 separates water vapor from the cathode off-gas, and uses the water vapor for humidifying the cathode gas. The back pressure regulating valve 25 is provided on a downstream side of the humidifier 23, and regulates a back pressure of the cathode off-gas depending on the opening degree. The expansion turbine 202 of the air compressor 20 is provided on a downstream side of the back pressure regulating valve 25, and is used for rotating the compression turbine 201 for the cathode gas.

A downstream side of the gas-liquid separator 24 is connected to one end of the cathode connection pipe L25 provided with the cathode discharge valve 27. The other end of the cathode connection pipe L25 is connected to the cathode discharge pipe L22. When the cathode discharge valve 27 is opened, the water stored in the gas-liquid separator 24 is drained into the cathode discharge pipe L22 as indicated by reference symbol R24. The cathode discharge valve 27 is an example of a discharge valve for draining the water flowing out through an opening at the bottom of the gas-liquid separator 24.

The cathode connection pipe L25 is connected to the cathode discharge pipe L22 on a downstream side of the air compressor 20. Therefore, the water is mixed with the cathode off-gas flowing through the cathode discharge pipe L22.

Since the gas-liquid separator 24 of the cathode system 2 separates water from the cathode off-gas, it is possible to suppress a decrease in the performance of the air compressor 20 due to the water sucked into the expansion turbine 202 on a downstream side of the gas-liquid separator 24.

The bypass pipe L23 connects the cathode supply pipe L20 and the cathode discharge pipe L22. One end of the bypass pipe L23 is connected to the cathode supply pipe L20 between the intercooler 21 and the three-way valve 22. The other end of the bypass pipe L23 is connected to the cathode discharge pipe L22 between the back pressure regulating valve 25 and the expansion turbine 202. The cathode gas flowing through the cathode supply pipe L20 is guided to the cathode discharge pipe L22 through the bypass pipe L23 at a flow rate that depends on the opening degree of the bypass valve 26.

The anode system 3 supplies the anode gas to the FC 10. The anode system 3 includes an anode supply pipe L30, an anode discharge pipe L32, a return pipe L33, an anode connection pipe L34, a fuel tank 30, a tank valve 31, a pressure regulating valve 32, an injector (INJ) 33, an ejector 34, a circulation pump 35, a gas-liquid separator 36, an anode discharge valve 37, an attitude control device 38, and a pressure sensor 39.

The fuel tank 30 stores the anode gas at a high pressure. The fuel tank 30 and the anode gas inlet 11 of the FC 10 are connected by the anode supply pipe L30. The anode discharge pipe L32 is connected to the anode gas outlet 12 of the FC 10. The return pipe L33 communicates the gas-liquid separator 36 with the anode supply pipe L30.

The tank valve 31, the pressure regulating valve 32, the INJ 33, and the ejector 34 are arranged in this order from an upstream side of the anode supply pipe L30. The tank valve 31 is kept open during an operation of the fuel cell system 1. The pressure regulating valve 32 causes the anode gas in the fuel tank 30 to flow into the INJ 33 at a flow rate that depends on the opening degree. The INJ 33 injects the anode gas into the ejector 34 as indicated by reference symbol R10. The anode gas is supplied to the FC 10 through the ejector 34 as indicated by reference symbol R11.

The INJ 33 supplies the anode gas to the FC 10. The ejector 34 is connected to the return pipe L33, and guides an anode off-gas discharged from the FC 10 back into the FC 10 together with the anode gas supplied from the INJ 33. Thus, the anode off-gas circulates through the FC 10. The anode off-gas that circulates through the FC 10 is referred to simply as "anode gas".

The anode gas flows through the anode gas channel L31 in the FC 10 as indicated by reference symbol R12. The FC 10 discharges the anode gas used in electric power generation as an anode off-gas into the anode discharge pipe L32 through the outlet 12. The anode off-gas is an example of the off-gas.

The anode discharge pipe L32 connects the outlet 12 and the gas-liquid separator 36. As indicated by reference symbol R13, the anode off-gas flows through the anode discharge pipe L32 from the outlet 12, and then flows into the gas-liquid separator 36.

The gas-liquid separator 36 separates water from the anode off-gas, and stores the separated water. For example, moisture generated through power generating reaction is mixed as water in the anode off-gas. Using a difference between the specific gravities of the anode off-gas and the water, the gas-liquid separator 36 stores the water having a greater specific gravity on a lower side in the vertical direction. The anode off-gas separated from the water by the gas-liquid separator 36 flows into the return pipe L33.

The return pipe L33 is provided with the circulation pump 35. The circulation pump 35 sends the anode off-gas from the gas-liquid separator 36 to the ejector 34 as indicated by reference symbol R14. The anode off-gas is mixed with the anode gas in the ejector 34. As indicated by reference symbol R11, the mixed anode off-gas flows through the anode supply pipe L30, and circulates through the FC 10. The pressure sensor 39 is provided on the anode supply pipe L30, and measures a pressure of the anode gas at the inlet 11 of the anode gas.

A downstream side of the gas-liquid separator 36 is connected to one end of the anode connection pipe L34 provided with the anode discharge valve 37. The other end of the anode connection pipe L34 is connected to the cathode discharge pipe L22. When the anode discharge valve 37 is opened, the water stored in the gas-liquid separator 36 is drained into the cathode discharge pipe L22 as indicated by reference symbol R15. The anode discharge valve 37 is an example of a discharge valve for draining the water flowing out through an opening at the bottom of the gas-liquid separator 36.

The anode connection pipe L34 is connected to the cathode discharge pipe L22 on the downstream side of the air compressor 20. Therefore, the water is mixed with the cathode off-gas flowing through the cathode discharge pipe L22.

The attitude control devices 28 and 38 control the attitudes of the gas-liquid separators 24 and 36, respectively. While the fuel cell vehicle 9 is traveling, the attitude control devices 28 and 38 adjust the attitudes of the gas-liquid separators 24 and 36 depending on an acceleration of the fuel cell vehicle 9 so that the water in the gas-liquid separators 24 and 36 smoothly flows into the cathode discharge valve 27 and the anode discharge valve 37, respectively. For example, when it is estimated that the temperatures in the gas-liquid separators 24 and 36 are below a freezing point while the fuel cell vehicle 9 is stopped, the attitude control devices 28 and 38 adjust the attitudes of the gas-liquid separators 24 and 36 depending on an inclination of the fuel cell vehicle 9 so that the water in the gas-liquid separators 24 and 36 hardly flows into the cathode discharge valve 27 and the anode discharge valve 37, respectively. The structures and operations of the attitude control devices 28 and 38 are described later.

The cooling system 4 cools the FC 10. The cooling system 4 includes a coolant supply pipe L40, a coolant discharge pipe L42, a radiator 40, a cooling pump 41, and a temperature sensor 42.

The coolant supply pipe L40 connects the radiator 40 and the inlet 16 of the FC 10. The coolant discharge pipe L42 connects the radiator 40 and the outlet 15 of the FC 10. The coolant supply pipe L40 is provided with the cooling pump 41 configured to send the coolant. The coolant discharge pipe L42 is provided with the temperature sensor 42 configured to detect the temperature of the coolant.

The radiator 40 cools the coolant discharged from the FC 10. The cooling pump 41 causes the cooled coolant to flow into the inlet 16 of the FC 10 through the coolant supply pipe L40. The coolant flows through the coolant channel L41 from the inlet 16, and is discharged to the coolant discharge pipe L42 from the outlet 15. The coolant flows through the coolant discharge pipe L42, and circulates through the radiator 40. The FC 10 is cooled by the coolant so that the power generating performance is maintained.

The control system 5 includes an ECU 50, an inclination sensor 51, acceleration sensors 52a and 52b, an accelerator operation amount sensor 53, and an ignition switch 54. The accelerator operation amount sensor 53 detects an operation amount of an accelerator (not illustrated) of the fuel cell vehicle 9, and notifies the ECU 50 of the accelerator operation amount. The ignition switch 54 is turned ON when the fuel cell vehicle 9 is started, and is turned OFF when the fuel cell vehicle 9 is stopped. The ECU 50 detects ON or OFF of the ignition switch 54.

Examples of the inclination sensor 51 include a gyroscope. The inclination sensor 51 detects an inclination of the fuel cell vehicle 9 with respect to the horizon plane Ho. For example, the inclination sensor 51 detects an inclination of the Hy axis of the fuel cell vehicle 9 with respect to the horizon plane, and an inclination of the Hx axis of the fuel cell vehicle 9 with respect to the horizon plane. The inclination sensor 51 notifies the ECU 50 of the inclination of the fuel cell vehicle 9.

The acceleration sensor 52a detects an acceleration $\alpha y$ along the Hy axis of the fuel cell vehicle 9. The acceleration sensor 52b detects an acceleration $\alpha x$ along the Hx axis of the fuel cell vehicle 9. The acceleration sensors 52a and 52b notify the ECU 50 of the accelerations $\alpha x$ and $\alpha y$ of the fuel cell vehicle 9. The acceleration $\alpha y$ is an acceleration in the fore-and-aft direction of the fuel cell vehicle 9. The acceleration ax is an acceleration in the lateral direction of the fuel cell vehicle 9.

The ECU 50 includes a central processing unit (CPU), a read only memory (ROM), and a random access memory (RAM). The accelerator operation amount sensor 53, the ignition switch 54, the inclination sensor 51, the acceleration sensors 52a and 52b, the air compressor 20, the three-way valve 22, the bypass valve 26, the back pressure regulating valve 25, the tank valve 31, the pressure regulating valve 32, the INJ 33, the cathode discharge valve 27, the anode discharge valve 37, the temperature sensor 42, the pressure sensors 29 and 39, the circulation pump 35, the cooling pump 41, and the attitude control devices 28 and 38 are electrically connected to the ECU 50.

The ECU 50 calculates a current value required in the FC 10 (hereinafter referred to as "required current value") based on the accelerator operation amount detected by the accelerator operation amount sensor 53. The ECU 50 sends an instruction for the flow rate of the cathode gas to the air compressor 20, and sends an instruction for the injection amount of the anode gas to the INJ 33. For example, the ECU 50 makes determination about a power generating condition of the FC 10 based on detection values from the pressure sensor 29 and the temperature sensor 42, and controls the opening degrees of the three-way valve 22, the bypass valve 26, the back pressure regulating valve 25, the tank valve 31, and the pressure regulating valve 32 and the output power of the circulation pump 35 and the cooling pump 41 depending on the power generating condition.

The ECU 50 instructs the air compressor 20 and the INJ 33 to scavenge the FC 10, the cathode system 2, and the anode system 3. The air compressor 20 scavenges the cathode supply pipe L20, the cathode gas channel L21, and the cathode discharge pipe L22 by sending the cathode gas in response to the instruction. The INJ 33 scavenges the anode supply pipe L30, the anode gas channel L31, and the return pipe L33 by injecting the anode gas in response to the instruction. The air compressor 20 and the INJ 33 are examples of a scavenging device configured to scavenge the FC 10 by sending reactive gases.

During the execution of the scavenging process, the ECU 50 opens the cathode discharge valve 27 and the anode discharge valve 37. Therefore, water stored in the gas-liquid separators 24 and 36 flows through the cathode connection pipe L25 and the anode connection pipe L34, and is drained to the outside through the cathode discharge pipe L22.

The water in the gas-liquid separator does not always accumulate at a position appropriate for draining. For example, during the acceleration of the fuel cell vehicle 9, the water in the gas-liquid separators 24 and 36 moves in a direction opposite to an acceleration direction and accumulates unevenly. Therefore, there is a possibility that the water is not smoothly drained because the water is located away from the openings at the bottoms of the gas-liquid separators 24 and 36. When the amount of saturated vapor decreases along with a decrease in temperature while the fuel cell vehicle 9 is parked, water vapor in the gas-liquid separators 24 and 36 is condensed into water and accumulates at the bottom in the vertical direction. The water flows into the cathode discharge valve 27 and the anode discharge valve 37 through the openings of the gas-liquid separators 24 and 36. When the temperature further decreases to a temperature below the freezing point, there is a possibility that the water cannot be drained because the cathode discharge valve 27 and the anode discharge valve 37 are frozen.

The attitude control devices 28 and 38 control the attitudes of the gas-liquid separators 24 and 36 relative to the fuel cell vehicle 9, respectively. The ECU 50 sends instructions for control targets of the attitudes of the gas-liquid separators 24 and 36 to the attitude control devices 28 and 38. The ECU 50 can adjust the positions of the water in the gas-liquid separators 24 and 36 based on the control targets of the attitudes of the gas-liquid separators 24 and 36. The ECU 50 is an example of an instruction device.

Description is given below taking the gas-liquid separator 36 and the attitude control device 38 as an example. The structures of the gas-liquid separator 24 and the attitude control device 28 are similar to those of the gas-liquid separator 36 and the attitude control device 38, and therefore their description is omitted.

Structures of Gas-Liquid Separator 36 and Attitude Control Device 38

Figure 3:
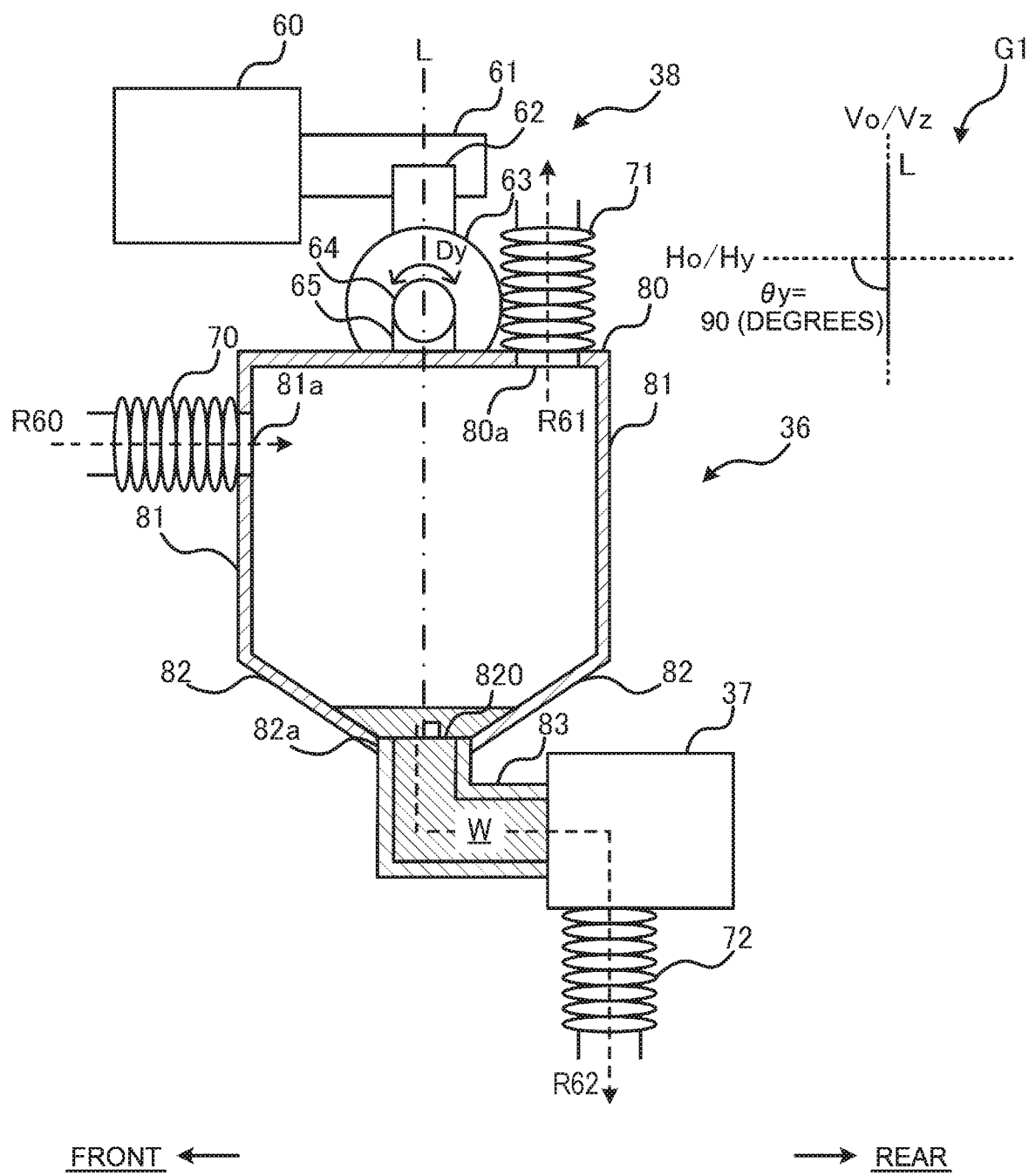
FIG. 3 is a side view of an attitude control device, a gas-liquid separator, and an anode discharge valve.
Figure 4:
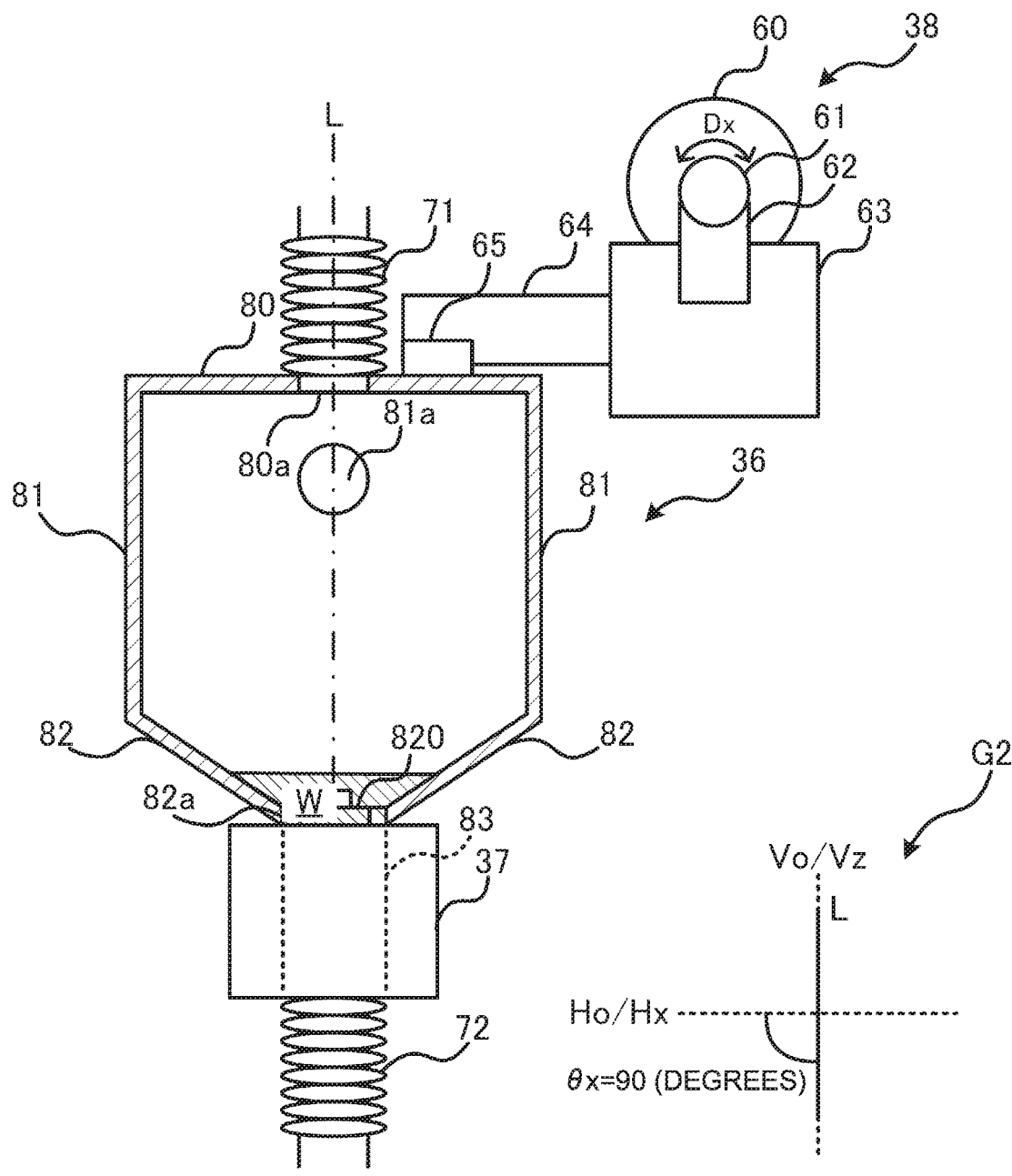
FIG. 4 is a rear view of the attitude control device, the gas-liquid separator, and the anode discharge valve.

FIG. 3 is a side view of the attitude control device 38, the gas-liquid separator 36, and the anode discharge valve 37. FIG. 4 is a rear view of the attitude control device 38, the gas-liquid separator 36, and the anode discharge valve 37. In FIG. 3, a right side of the drawing sheet corresponds to a rear side of the fuel cell vehicle 9, and a left side of the drawing sheet corresponds to a front side of the fuel cell vehicle 9. In FIG. 4, a right side of the drawing sheet corresponds to a right side of the fuel cell vehicle 9, and a left side of the drawing sheet corresponds to a left side of the fuel cell vehicle 9. FIG. 3 and FIG. 4 illustrate cross sections of the gas-liquid separator 36.

Reference symbols G1 and G2 represent inclinations of the Hy axis, the Hx axis, and the Vz axis with respect to the horizon plane Ho and the vertical direction Vo, and an attitude direction L of the gas-liquid separator 36. The Hy axis and the Hx axis are parallel to the horizon plane Ho. The Vz axis is parallel to the vertical direction Vo.

The gas-liquid separator 36 has a cylinder 81, a top 80, and a funneled bottom 82. The top 80 covers the cylinder 81. The bottom 82 extends from the lower end of the cylinder 81. The cylinder 81 has an inflow port 81$a$ on its front side, and the anode off-gas and water flow from the FC 10 into the gas-liquid separator 36 through the inflow port 81$a$. The top 80 has an outflow port 80$a$ through which the anode off-gas flows out. The inflow port 81$a$ is connected to a bellows pipe 70, which is a part of the anode discharge pipe L32. The outflow port 80$a$ is connected to a bellows pipe 71, which is a part of the return pipe L33.

The inflow port 81$a$ is an example of an inlet of the anode off-gas discharged from the FC 10. The outflow port 80$a$ is an example of an outlet of the anode off-gas to be circulated through the FC 10. For example, the inflow port 81$a$ and the outflow port 80$a$ are circular openings, but their shapes are not limited.

An opening 82$a$ is provided at the center of the bottom 82. A direction perpendicular to a plane 820 of the opening 82$a$ is the attitude direction L of the gas-liquid separator 36. An L-shaped pipe 83 is connected to the lower end of the bottom 82. An opening of the pipe 83 fits with the opening 82$a$ at the bottom 82. The pipe 83 is a part of the anode connection pipe L34, and connects the bottom 82 and an upstream side of the anode discharge valve 37. The pipe 83 extends from the bottom 82 along the attitude direction L, and is bent in the middle at a right angle toward the anode discharge valve 37.

A downstream side of the anode discharge valve 37 is connected to the cathode discharge pipe L22 via a bellows pipe 72. The bellows pipe 72 is a part of the anode connection pipe L34. The bellows pipes 70 to 72 are examples of a flexible pipe. When the attitude of the gas-liquid separator 36 changes, the attitude of the anode discharge valve 37 changes together with the gas-liquid separator 36, but the bellows pipes 70 to 72 flexibly deform in response to the change in the attitude of the gas-liquid separator 36. Therefore, the other members can keep their attitudes. Rubber pipes may be used in place of the bellows pipes 70 to 72.

The anode off-gas and the water discharged from the FC 10 flow into the gas-liquid separator 36 through the inflow port 81$a$ as indicated by reference symbol R60. The anode off-gas is discharged through the outflow port 80$a$ as indicated by reference symbol R61. The water is separated from the anode off-gas due to the difference between the specific gravities of the water and the anode off-gas. Separated water W is stored in the pipe 83 and in an area within the cylinder 81 or the bottom 82. When the anode discharge valve 37 is opened, the stored water W is drained as indicated by reference symbol R62.

The attitude control device 38 is connected to the top 80 of the gas-liquid separator 36, and controls the attitude of the gas-liquid separator 36. The attitude control device 38 includes an upper motor 60, an upper rotation shaft 61, an upper fixing member 62, a lower motor 63, a lower rotation shaft 64, and a lower fixing member 65.

The upper motor 60 rotates the upper rotation shaft 61 as indicated by reference symbol Dx. The lower motor 63 rotates the lower rotation shaft 64 as indicated by reference symbol Dy. The upper rotation shaft 61 is fixed to the upper face of the lower motor 63 by the upper fixing member 62. The lower rotation shaft 64 is fixed to the top 80 by the lower fixing member 65. When the upper rotation shaft 61 rotates, the lower motor 63, the lower rotation shaft 64, and the gas-liquid separator 36 rotate in association with the upper rotation shaft 61. When the lower rotation shaft 64 rotates, the gas-liquid separator 36 rotates in association with the lower rotation shaft 64.

The lower motor 63 controls an angle θy of the attitude direction L of the gas-liquid separator 36 with respect to the Hy axis. The ECU 50 sends an instruction for a target value of the angle θy to the lower motor 63. The lower motor 63 controls the angle θy at the target value in response to the instruction from the ECU 50. The angle θy is an example of a first angle of the gas-liquid separator 36 with respect to the fore-and-aft direction of the fuel cell vehicle 9.

The upper motor 60 controls an angle θx of the attitude direction L of the gas-liquid separator 36 with respect to the Hx axis. The ECU 50 sends an instruction for a target value of the angle θx to the upper motor 60. The upper motor 60 controls the angle θx at the target value in response to the instruction from the ECU 50. The angle θx is an example of a second angle of the gas-liquid separator 36 with respect to the lateral direction of the fuel cell vehicle 9.

When the fuel cell vehicle 9 is traveling at a constant speed, the ECU 50 controls the attitude control device 38 so that the attitude direction L of the gas-liquid separator 36 is orthogonal to the horizon plane Ho. The ECU 50 sends instructions for 90 degrees to the upper motor 60 and the lower motor 63 as the target values of the angles θx and θy.

As described above, the attitude control device 38 controls the angle θy of the gas-liquid separator 36 with respect to the fore-and-aft direction of the fuel cell vehicle 9 and the angle θx of the gas-liquid separator 36 with respect to the lateral direction of the fuel cell vehicle 9 so that the angles θy and θx reach their target values. The ECU 50 sends instructions for the target values of the angles θy and θx as the control target of the attitude of the gas-liquid separator 36. Thus, the attitude of the gas-liquid separator 36 can freely be controlled in both the fore-and-aft direction and the lateral direction of the fuel cell vehicle 9.

Attitude Control During Acceleration of Fuel Cell Vehicle 9

Figure 5:
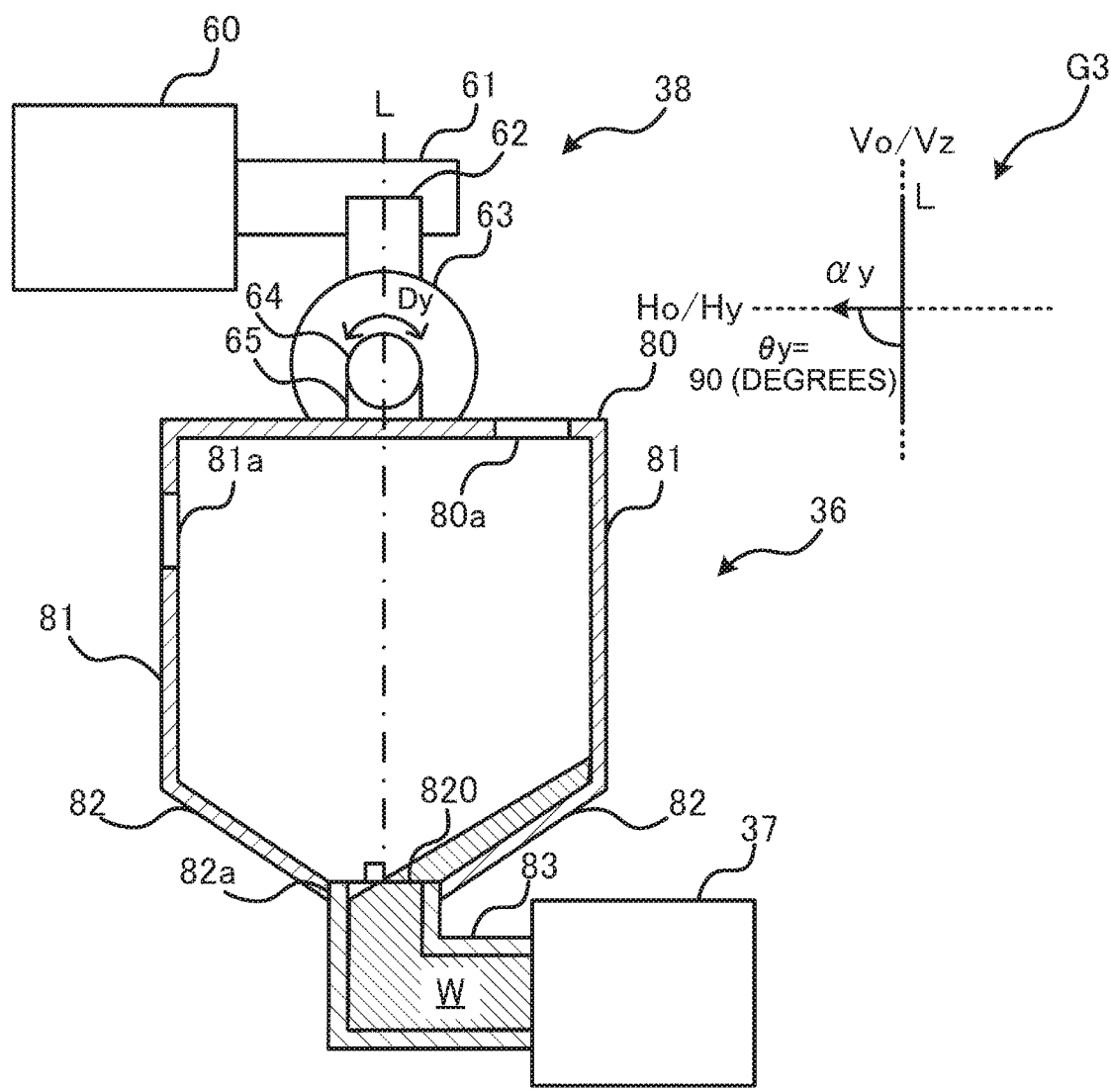
FIG. 5 is a diagram illustrating an example of unevenness of water during acceleration of the fuel cell vehicle.

FIG. 5 is a diagram illustrating an example of unevenness of the water W during acceleration of the fuel cell vehicle 9. In FIG. 5, components in common with those in FIG. 3 are represented by the same reference symbols to omit their description. Illustration of the bellows pipes 70 to 72 is omitted as well.

Forward acceleration of the fuel cell vehicle 9 is taken as an example. It is assumed that the fuel cell vehicle 9 is not accelerated in the lateral direction. In this case, the acceleration αy along the Hy axis is applied to the gas-liquid separator 36 as indicated by reference symbol G3. Due to reaction against an acceleration force, the water W moves in a direction opposite to the acceleration direction and accumulates unevenly. That is, the surface of the water W is inclined with respect to the plane 820 of the opening 82a. Therefore, there is a possibility that the water W is not smoothly drained because the water W is located away from the opening 82a.

The ECU 50 determines a target value of the angle θy of the attitude direction L of the gas-liquid separator 36 so that the unevenness of the water W stored in the gas-liquid separator 36 is reduced.

Figure 6:
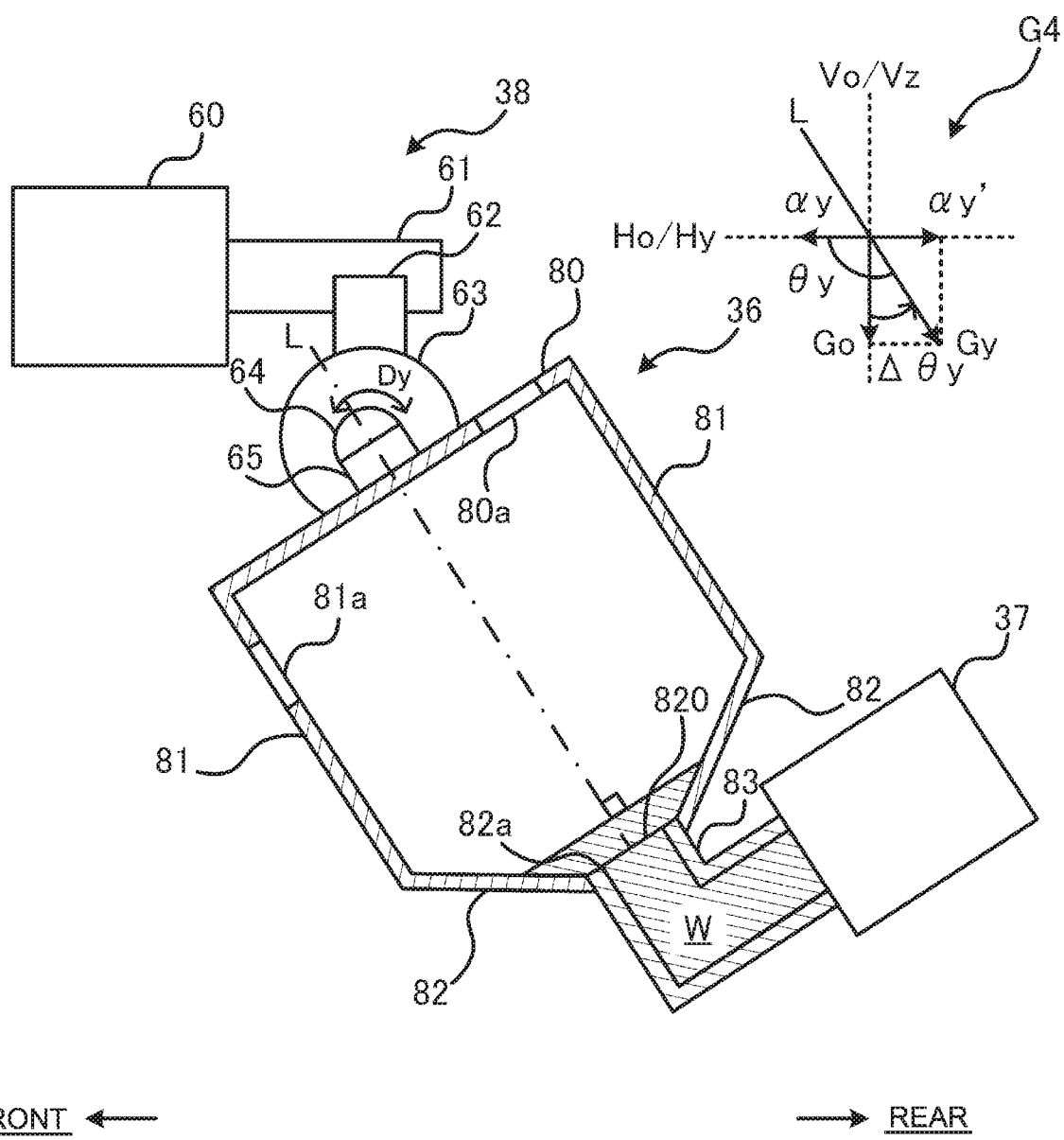
FIG. 6 is a diagram illustrating an example of attitude control during the acceleration of the fuel cell vehicle.

FIG. 6 is a diagram illustrating an example of attitude control during the acceleration of the fuel cell vehicle 9. In FIG. 6, components in common with those in FIG. 3 are represented by the same reference symbols to omit their description. Illustration of the bellows pipes 70 to 72 is omitted as well.

The acceleration sensor 52a detects the acceleration αy along the Hy axis, and notifies the ECU 50 of the acceleration αy. The ECU 50 determines the target value of the angle θy based on the acceleration αy and a gravitational acceleration Go so that the opening 82a of the gas-liquid separator 36 is inclined in the acceleration direction of the fuel cell vehicle 9 as indicated by reference symbol G4. For example, the ECU 50 calculates a resultant force Gy of the gravity and a reaction force αy' against the acceleration force through vector operation, and calculates an angle θy of the resultant force Gy with respect to the Hy axis as the target value.

The lower motor 63 changes the angle θy of the attitude direction L with respect to the Hy axis from the angle θy in FIG. 3 (90 degrees) by an angle Δθy based on the acceleration αy. The target value of the angle θy is (90 degrees+ Δθy).

The water W stored in the gas-liquid separator 36 receives the resultant force Gy in a direction substantially orthogonal to the plane 820 of the opening 82a. Therefore, the unevenness of the water W is reduced, and the surface of the water W and the plane 820 of the opening 82a are substantially parallel to each other. Thus, the water W flows through the pipe 83, and is easily drained through the anode discharge valve 37. Since the acceleration in the lateral direction of the fuel cell vehicle 9 is 0, the upper motor 60 keeps the angle θx with respect to the Hx axis at 90 degrees.

As described above, the ECU 50 determines the target value of the angle θy so that the attitude direction L orthogonal to the plane 820 of the opening 82a coincides with the direction of the resultant force Gy. Therefore, the gas-liquid separator 36 is in such an attitude that the water W is drained most smoothly through the opening 82a. The attitude direction L need not essentially coincide with the direction of the resultant force Gy. The ECU 50 only needs to determine the target value of the angle θy so that the attitude direction L is closer to the direction of the resultant force Gy.

In this example, the fuel cell vehicle 9 is accelerated forward. When the fuel cell vehicle 9 is accelerated rearward, the direction of the acceleration αy is a rearward direction, and therefore the attitude direction L of the gas-liquid separator 36 is inclined in a direction opposite to that in this example. The angle θx of the attitude direction L of the gas-liquid separator 36 with respect to the Hx axis is controlled by a method similar to the method described above.

Figure 7:
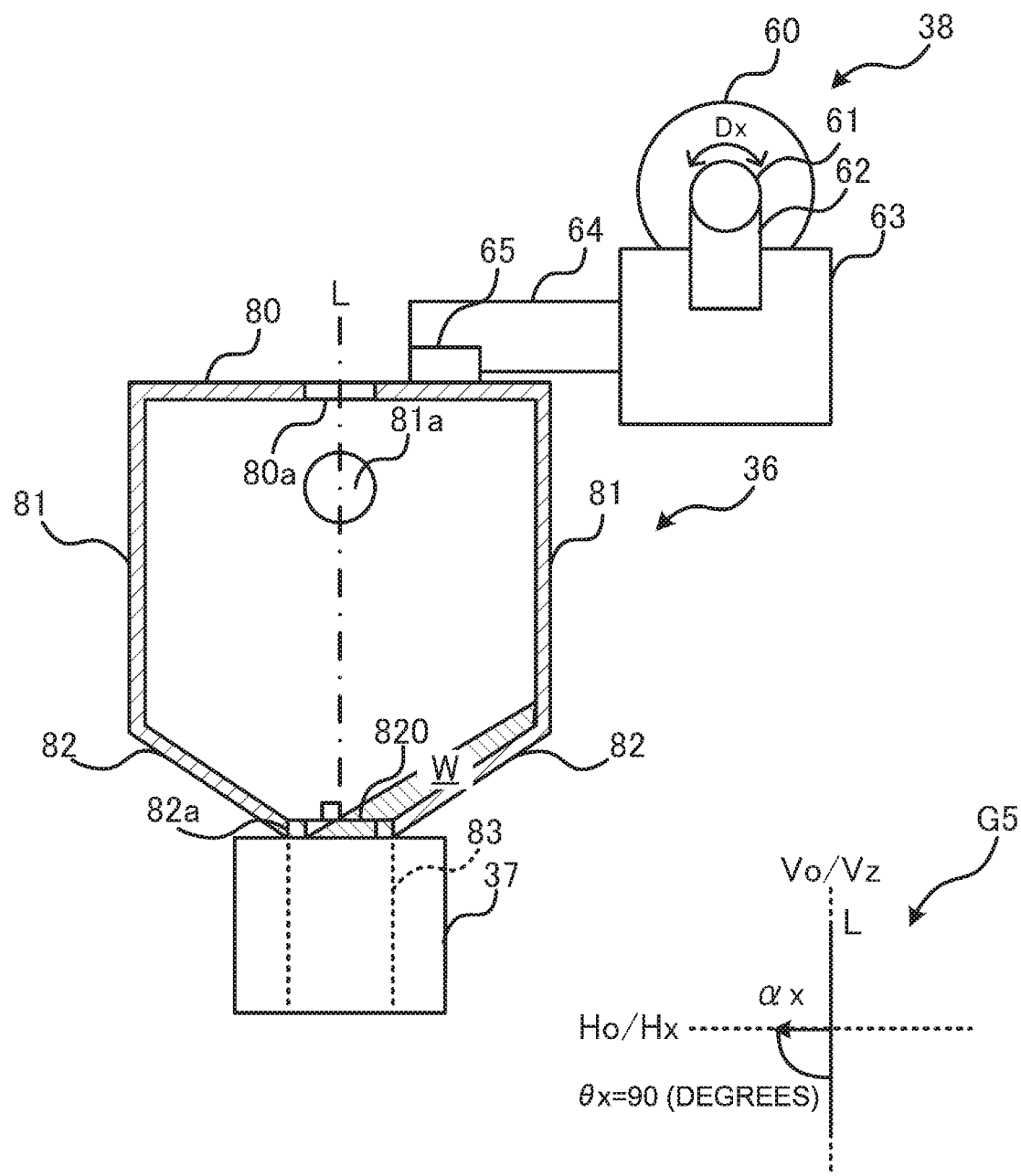
FIG. 7 is a diagram illustrating another example of the unevenness of water during the acceleration of the fuel cell vehicle.

FIG. 7 is a diagram illustrating another example of the unevenness of the water W during the acceleration of the fuel cell vehicle 9. In FIG. 7, components in common with those in FIG. 4 are represented by the same reference symbols to omit their description. Illustration of the bellows pipes 70 to 72 is omitted as well.

Leftward acceleration of the fuel cell vehicle 9 is taken as an example. It is assumed that the fuel cell vehicle 9 is not accelerated in the fore-and-aft direction. In this case, the acceleration ax along the Hx axis is applied to the gas-liquid separator 36 as indicated by reference symbol G5. Due to reaction against an acceleration force, the water W moves in a direction opposite to the acceleration direction and accumulates unevenly. That is, the surface of the water W is inclined with respect to the plane 820 of the opening 82a. Therefore, there is a possibility that the water W is not smoothly drained because the water W is located away from the opening 82a.

The ECU 50 determines a target value of the angle θx of the attitude direction L of the gas-liquid separator 36 so that the unevenness of the water W stored in the gas-liquid separator 36 is reduced.

Figure 8:
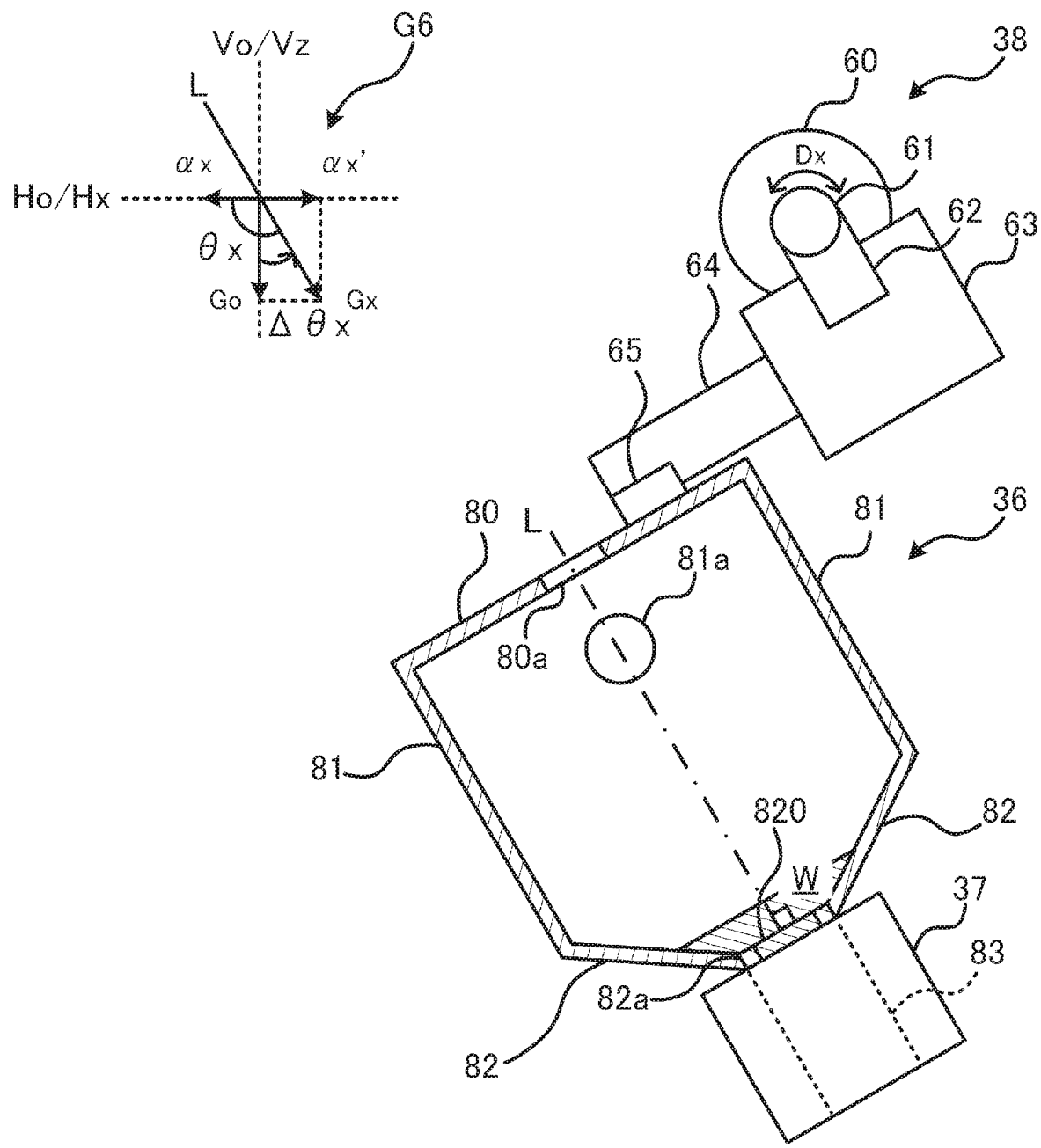
FIG. 8 is a diagram illustrating another example of the attitude control during the acceleration of the fuel cell vehicle.

FIG. 8 is a diagram illustrating another example of the attitude control during the acceleration of the fuel cell vehicle 9. In FIG. 8, components in common with those in FIG. 4 are represented by the same reference symbols to omit their description. Illustration of the bellows pipes 70 to 72 is omitted as well.

The acceleration sensor 52b detects the acceleration αx along the Hx axis, and notifies the ECU 50 of the acceleration αx. The ECU 50 determines the target value of the angle θx based on the acceleration αx and the gravitational acceleration Go so that the opening 82a of the gas-liquid separator 36 is inclined in the acceleration direction of the fuel cell vehicle 9 as indicated by reference symbol G6. For example, the ECU 50 calculates a resultant force Gx of the gravity and a reaction force αx' against the acceleration force through vector operation, and calculates an angle θx of the resultant force Gx with respect to the Hx axis as the target value.

The upper motor 60 changes the angle θx of the attitude direction L with respect to the Hx axis from the angle θx in FIG. 4 (90 degrees) by an angle Δθx based on the acceleration αx. The target value of the angle θx is (90 degrees+ Δθx).

The water W stored in the gas-liquid separator 36 receives the resultant force Gx in a direction substantially orthogonal to the plane 820 of the opening 82a. Therefore, the unevenness of the water W is reduced, and the surface of the water W and the plane 820 of the opening 82a are substantially parallel to each other. Thus, the water W flows through the pipe 83, and is easily drained through the anode discharge valve 37. Since the acceleration αy in the fore-and-aft direction of the fuel cell vehicle 9 is 0, the lower motor 63 keeps the angle θy with respect to the Hy axis at 90 degrees.

As described above, the ECU 50 determines the target value of the angle θx so that the attitude direction L orthogonal to the plane 820 of the opening 82a coincides with the direction of the resultant force Gx. Therefore, the gas-liquid separator 36 is in such an attitude that the water W is drained most smoothly through the opening 82a. The attitude direction L need not essentially coincide with the direction of the resultant force Gx. The ECU 50 only needs to determine the target value of the angle θx so that the attitude direction L is closer to the direction of the resultant force Gx.

In this example, the fuel cell vehicle 9 is accelerated leftward. When the fuel cell vehicle 9 is accelerated rightward, the direction of the acceleration αx is a rightward direction, and therefore the attitude direction L of the gas-liquid separator 36 is inclined in a direction opposite to that in this example.

When the fuel cell vehicle 9 is accelerated simultaneously in the directions of the Hx axis and the Hy axis, the ECU 50 determines the target values of the angles θy and θx based on the gravitational acceleration and the accelerations αy and αx detected by the acceleration sensors 52a and 52b, respectively. For example, the ECU 50 calculates, through vector operation, the resultant force Gy of the gravity and the reaction force against the acceleration force on the Hy axis and the resultant force Gx of the gravity and the reaction force against the acceleration force on the Hx axis, and determines the target values of the angles θy and θx so that the attitude direction L coincides with the directions of the resultant forces Gy and Gx. Thus, the actions and effects described above are attained.

Attitude Control when Fuel Cell Vehicle 9 is Parked

When the fuel cell vehicle 9 is parked, the ignition switch 54 is turned OFF. When the ECU 50 detects that the ignition switch 54 is turned OFF, the ECU 50 stops the electric power generation in the FC 10. At this time, the ECU 50 stops the supply of the cathode gas to the air compressor 20 and the supply of the anode gas to the INJ 33. The ECU 50 opens the cathode discharge valve 27 and the anode discharge valve 37 to drain water in the gas-liquid separators 24 and 36.

When the temperature decreases, water vapor in the gas-liquid separators 24 and 36 is condensed into new water and the water flowing into the anode discharge valve 37 through the opening 82a may be frozen at a temperature below the freezing point. Since the pipe 83 connecting the opening 82a of the gas-liquid separator 36 and the anode discharge valve 37 has the L-shape, the water stays at the bottom of the pipe 83, and hardly flows into the anode discharge valve 37. Depending on the amount of water or an inclination of the parked fuel cell vehicle 9, the water may flow into the anode discharge valve 37.

When the ECU 50 estimates that the temperature in the gas-liquid separator 36 changes to a temperature below the freezing point, the ECU 50 determines the target values of the angles θy and θx of the gas-liquid separator 36 so that the water does not flow into the anode discharge valve 37 through the opening 82a as described below. Since the flow of the water W into the anode discharge valve 37 from the gas-liquid separator 36 is suppressed, the freezing of the anode discharge valve 37 is suppressed.

Figure 9:
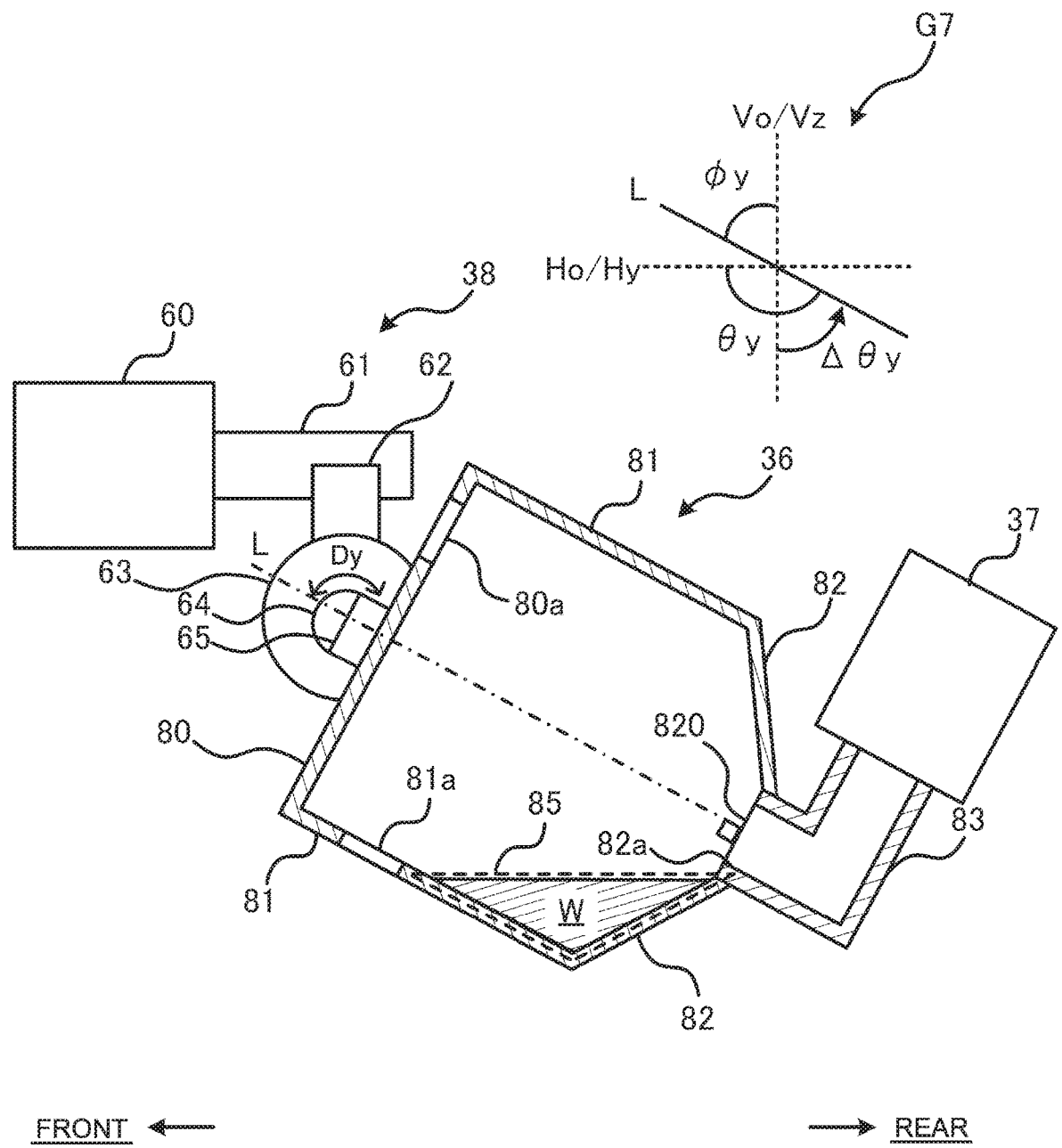
FIG. 9 is a diagram illustrating an example of attitude control for the gas-liquid separator when the fuel cell vehicle is parked on a flat ground.

FIG. 9 is a diagram illustrating an example of attitude control for the gas-liquid separator 36 when the fuel cell vehicle 9 is parked on a flat ground. In FIG. 9, components in common with those in FIG. 3 are represented by the same reference symbols to omit their description. Illustration of the bellows pipes 70 to 72 is omitted as well.

As indicated by reference symbol G7, the Hy axis is not inclined with respect to the horizon plane Ho, and the Vz axis coincides with the vertical direction Vo. The ECU 50 determines a target value of the angle θy so that the attitude direction L has a predetermined reference angle φy with respect to the vertical direction Vo.

The gas-liquid separator 36 has a water storage area 85 where the water W can be stored without flowing out through the opening 82a when the attitude direction L has the reference angle φy with respect to the vertical direction Vo. For example, the water storage area 85 is a recessed area defined by the cylinder 81 and the bottom 82 on the front side of the fuel cell vehicle 9 when viewed from the opening 82a.

The lower motor 63 changes the angle θy of the attitude direction L with respect to the Hy axis from the angle θy in FIG. 3 (90 degrees) by an angle Δθy equal to the reference angle φy. The target value of the angle θy is (90 degrees+ Δθy).

Since the attitude direction L has the reference angle φy with respect to the vertical direction Vo, the water W generated by condensation is stored in the water storage area 85. Thus, the flow of the water W into the anode discharge valve 37 through the opening 82a is suppressed. Even if the water W stored in the water storage area 85 is frozen at a temperature below the freezing point, the draining of the water W is not affected because the anode discharge valve 37 is opened and closed without hindrance.

When the Hy axis is inclined with respect to the horizon plane Ho and the Vz axis does not coincide with the vertical direction Vo, the ECU 50 determines the target value of the angle θy so that the attitude direction L has the predetermined reference angle φy with respect to the vertical direction Vo depending on the inclination detected by the inclination sensor 51. Description is given of a case where the fuel cell vehicle 9 is parked while being inclined in the fore-and-aft direction.

Figure 10:
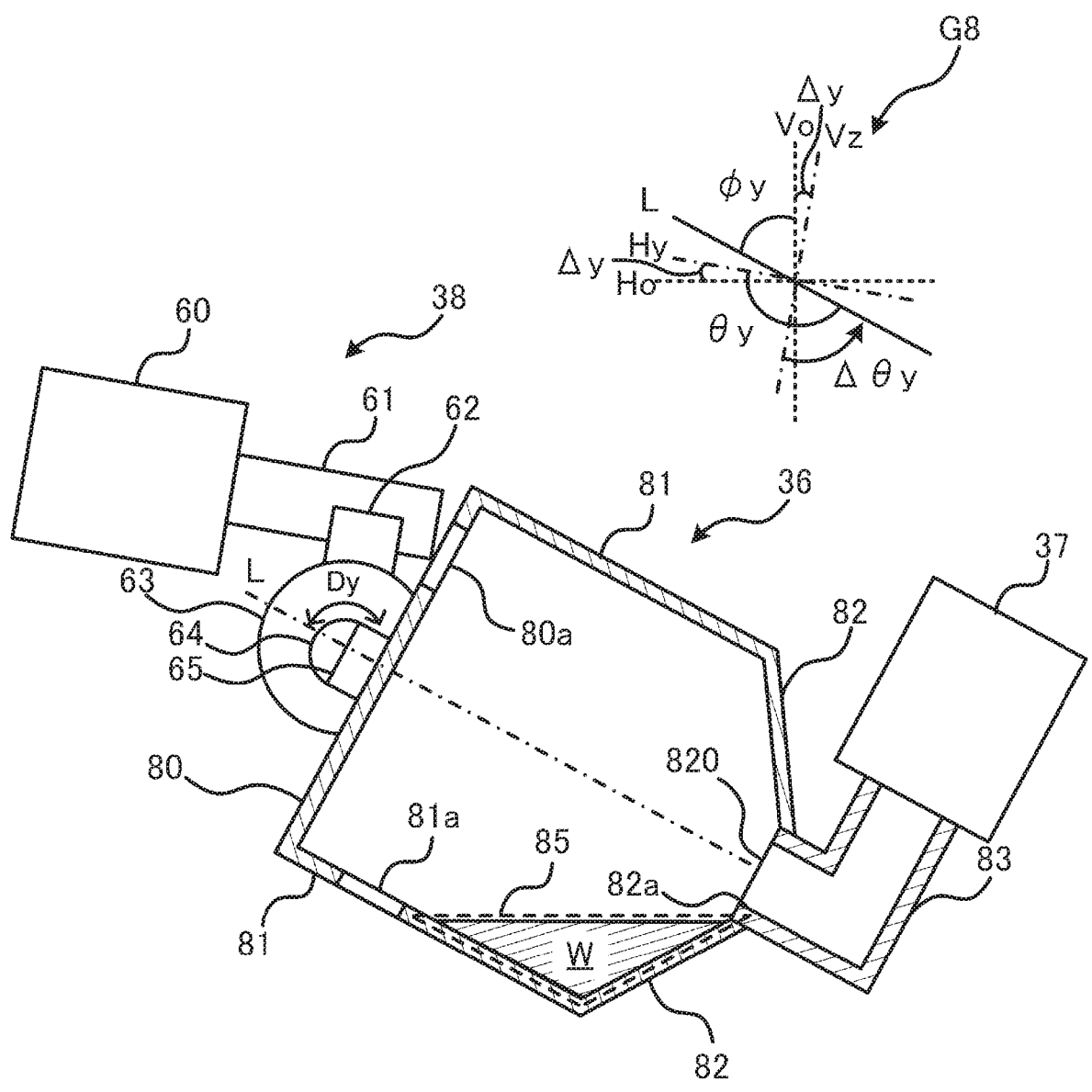
FIG. 10 is a diagram illustrating an example of attitude control for the gas-liquid separator when the fuel cell vehicle is parked while being inclined in a fore-and-aft direction.

FIG. 10 is a diagram illustrating an example of attitude control for the gas-liquid separator 36 when the fuel cell vehicle 9 is parked while being inclined in the fore-and-aft direction. In FIG. 10, components in common with those in FIG. 9 are represented by the same reference symbols to omit their description. Illustration of the bellows pipes 70 to 72 is omitted as well.

As indicated by reference symbol G8, the Hy axis is inclined by $\Delta y$ with respect to the horizon plane Ho, and the Vz axis deviates from the vertical direction Vo by the angle $\Delta y$. That is, the fuel cell vehicle 9 is parked in a state in which the fore-and-aft direction is inclined at the angle $\Delta y$ with respect to the horizon plane Ho. The Hx axis is parallel to the horizon plane Ho. The ECU 50 determines the target value of the angle $\theta y$ so that the attitude direction L has the reference angle $\phi y$ with respect to the vertical direction Vo depending on the angle $\Delta y$ detected by the inclination sensor 51.

The lower motor 63 changes the angle $\theta y$ of the attitude direction L with respect to the Hy axis from the angle $\theta y$ in FIG. 3 (90 degrees) by an angle $\Delta \theta y$ equal to the sum of the reference angle $\phi y$ and the angle $\Delta y$. The target value of the angle $\theta y$ is (90 degrees+$\Delta \theta y$).

Since the attitude direction L has the reference angle $\phi y$ with respect to the vertical direction Vo, actions and effects similar to those in the example of FIG. 9 are attained even if the fore-and-aft direction of the fuel cell vehicle 9 is inclined with respect to the horizon plane Ho.

In this example, the water storage area 85 is located on the front side of the fuel cell vehicle 9 when viewed from the opening 82a, but the water storage area is not limited to the water storage area 85. As in the following example, the water storage area may be located on the left side of the fuel cell vehicle 9 when viewed from the opening 82a.

Figure 11:
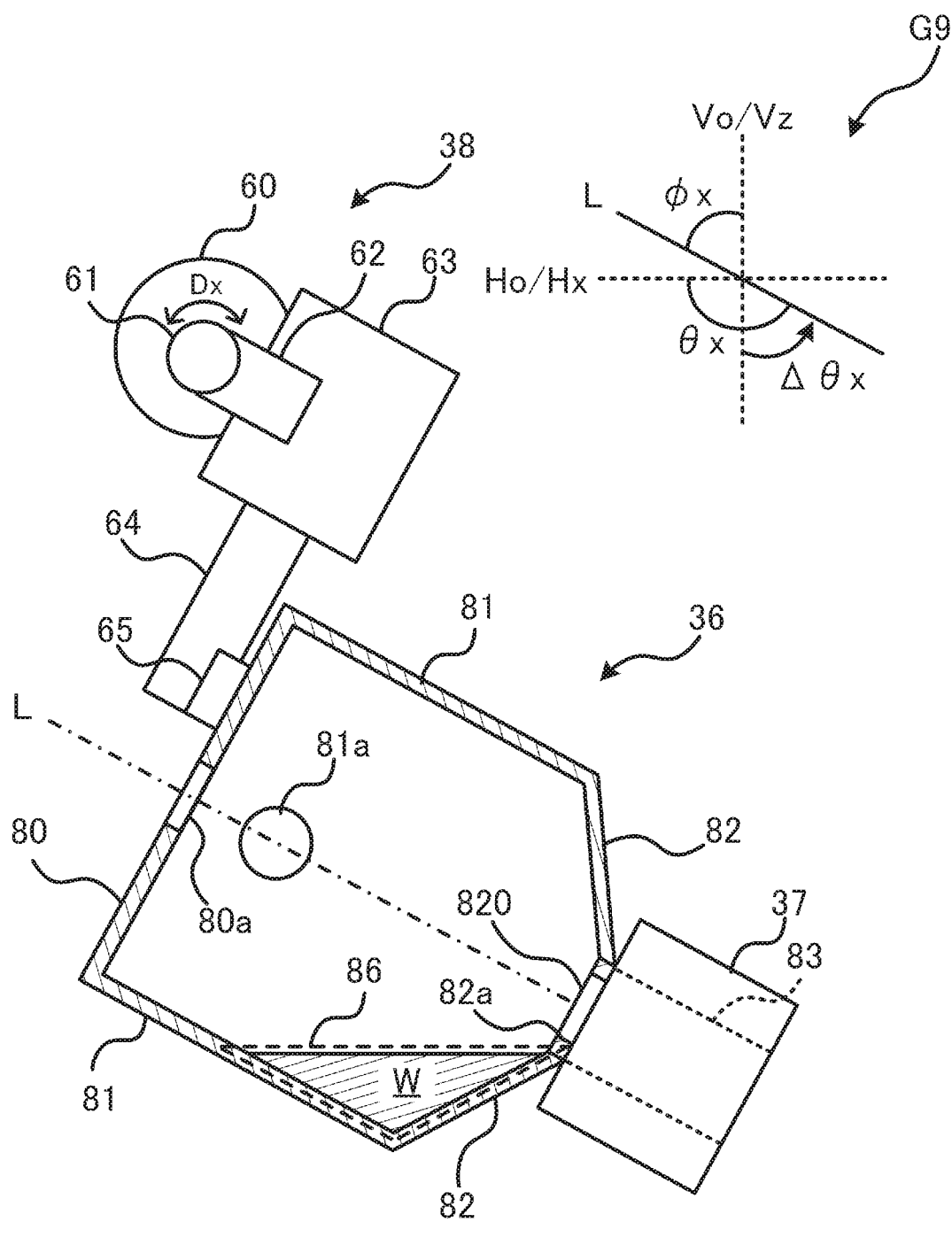
FIG. 11 is a diagram illustrating another example of the attitude control for the gas-liquid separator when the fuel cell vehicle is parked on the flat ground.

FIG. 11 is a diagram illustrating another example of the attitude control for the gas-liquid separator 36 when the fuel cell vehicle 9 is parked on the flat ground. In FIG. 11, components in common with those in FIG. 4 are represented by the same reference symbols to omit their description. Illustration of the bellows pipes 70 to 72 is omitted as well.

As indicated by reference symbol G9, the Hx axis is not inclined with respect to the horizon plane Ho, and the Vz axis coincides with the vertical direction Vo. The ECU 50 determines a target value of the angle $\theta x$ so that the attitude direction L has a predetermined reference angle $\phi x$ with respect to the vertical direction Vo.

The gas-liquid separator 36 has a water storage area 86 where the water W can be stored without flowing out through the opening 82a when the attitude direction L has the reference angle $\phi x$ with respect to the vertical direction Vo. For example, the water storage area 86 is a recessed area defined by the cylinder 81 and the bottom 82 on the left side of the fuel cell vehicle 9 when viewed from the opening 82a.

The upper motor 60 changes the angle $\theta x$ of the attitude direction L with respect to the Hx axis from the angle $\theta x$ in FIG. 4 (90 degrees) by an angle $\Delta \theta x$ equal to the reference angle $\phi x$. The target value of the angle $\theta x$ is (90 degrees+$\Delta \theta x$).

Since the attitude direction L has the reference angle $\phi x$ with respect to the vertical direction Vo, the water W generated by condensation is stored in the water storage area 86. Thus, the flow of the water W into the anode discharge valve 37 through the opening 82a is suppressed. Even if the water W stored in the water storage area 86 is frozen at a temperature below the freezing point, the draining of the water W is not affected because the anode discharge valve 37 is opened and closed without hindrance.

When the fuel cell vehicle 9 is parked while being inclined in the lateral direction, the ECU 50 determines the target value of the angle $\theta x$ of the attitude direction L with respect to the Hx axis so that the attitude direction L has the reference angle $\phi x$ with respect to the vertical direction Vo.

Figure 12:
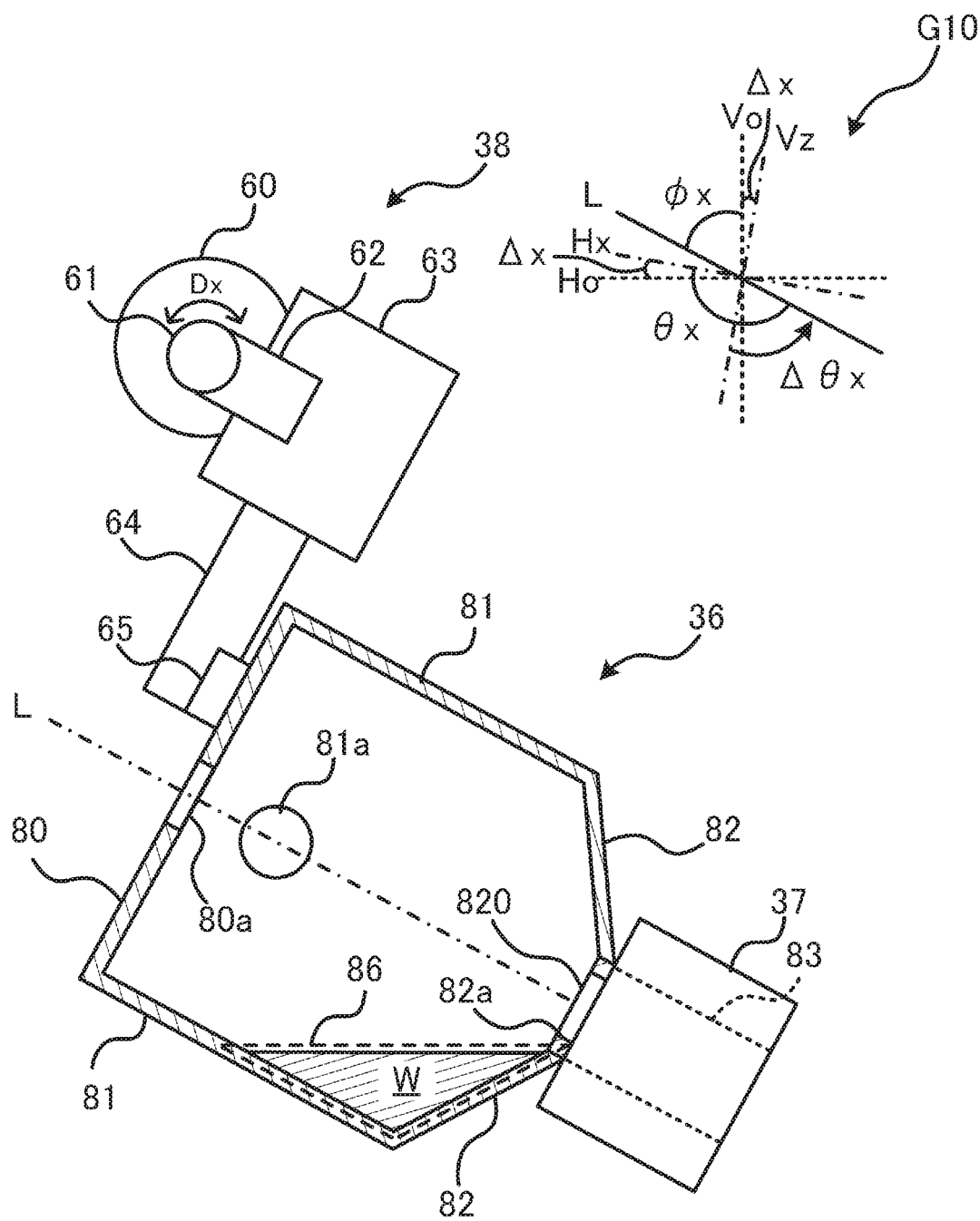
FIG. 12 is a diagram illustrating an example of attitude control for the gas-liquid separator when the fuel cell vehicle is parked while being inclined in a lateral direction.

FIG. 12 is a diagram illustrating an example of attitude control for the gas-liquid separator 36 when the fuel cell vehicle 9 is parked while being inclined in the lateral direction. In FIG. 12, components in common with those in FIG. 11 are represented by the same reference symbols to omit their description. Illustration of the bellows pipes 70 to 72 is omitted as well.

As indicated by reference symbol G10, the Hx axis is inclined by $\Delta x$ with respect to the horizon plane Ho, and the Vz axis deviates from the vertical direction Vo by the angle $\Delta x$. That is, the fuel cell vehicle 9 is parked in a state in which the lateral direction is inclined at the angle $\Delta x$ with respect to the horizon plane Ho. The Hy axis is parallel to the horizon plane Ho. The ECU 50 determines the target value of the angle $\theta x$ so that the attitude direction L has the reference angle $\phi x$ with respect to the vertical direction Vo depending on the angle $\Delta x$ detected by the inclination sensor 51.

The upper motor 60 changes the angle $\theta x$ of the attitude direction L with respect to the Hx axis from the angle $\theta x$ in FIG. 4 (90 degrees) by an angle $\Delta \theta x$ equal to the sum of the reference angle $\phi x$ and the angle $\Delta x$. The target value of the angle $\theta x$ is (90 degrees+$\Delta \theta x$).

Since the attitude direction L has the reference angle $\phi x$ with respect to the vertical direction Vo, actions and effects similar to those in the example of FIG. 11 are attained even if the lateral direction of the fuel cell vehicle 9 is inclined with respect to the horizon plane Ho.

When the fuel cell vehicle 9 is parked in a state in which both the fore-and-aft direction and the lateral direction are inclined with respect to the horizon plane Ho, the ECU 50 determines the target values of the angles $\theta y$ and $\theta x$ by a method similar to the method described above so that the water W is stored in a water storage area in the gas-liquid separator 36 that is defined by the reference angles $\phi y$ and $\phi x$.

When the ECU 50 estimates that the temperature in the gas-liquid separator 36 does not change to a temperature below the freezing point, the ECU 50 determines the angles $\theta y$ and $\theta x$ of the attitude direction L with respect to the horizon plane Ho so that the water W is smoothly drained contrary to the example described above. Control for the angle $\theta y$ is described as an example, but control for the angle $\theta x$ is executed similarly to that for the angle $\theta y$.

Figure 13:
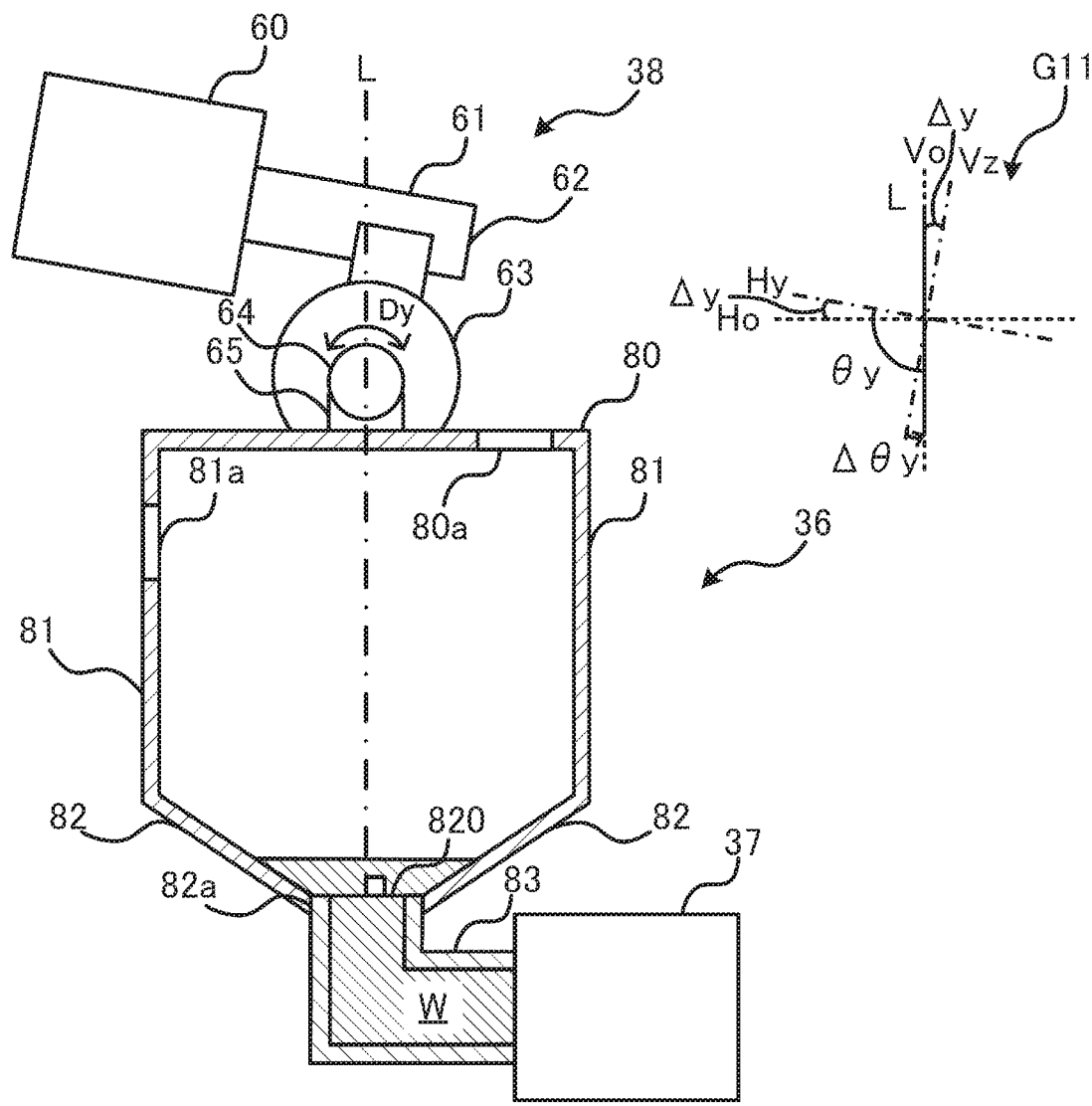
FIG. 13 is a diagram illustrating another example of the attitude control for the gas-liquid separator when the fuel cell vehicle is parked while being inclined in the fore-and-aft direction.

FIG. 13 is a diagram illustrating another example of the attitude control for the gas-liquid separator 36 when the fuel cell vehicle 9 is parked while being inclined in the fore-and-aft direction. In FIG. 13, components in common with those in FIG. 10 are represented by the same reference symbols to omit their description. Illustration of the bellows pipes 70 to 72 is omitted as well.

As indicated by reference symbol G11, the Hy axis is inclined by $\Delta y$ with respect to the horizon plane Ho, and the Vz axis deviates from the vertical direction Vo by the angle $\Delta y$. That is, the fuel cell vehicle 9 is parked in a state in which the fore-and-aft direction is inclined at the angle $\Delta y$ with respect to the horizon plane Ho. The ECU 50 determines the target value of the angle $\theta y$ so that the attitude direction L is orthogonal to the plane 820 of the opening 82a depending on the angle $\Delta y$ detected by the inclination sensor 51. That is, the ECU 50 determines the target value of the angle θy so that the plane 820 of the opening 82a is orthogonal to the vertical direction Vo depending on the angle Δy.

The lower motor 63 changes the angle θy of the attitude direction L with respect to the Hy axis from the angle θy in FIG. 3 (90 degrees) by an angle Δθy equal to the angle Δy. The target value of the angle θy is (90 degrees+Δθy).

The water W stored in the gas-liquid separator 36 receives the gravity along the vertical direction Vo. Therefore, the surface of the water W and the plane 820 of the opening 82a are substantially parallel to each other. Thus, the water W flows through the pipe 83, and is easily drained through the anode discharge valve 37.

In the example described above, the pipe 83 has the L-shape, but may have a straight shape.

Figure 14:
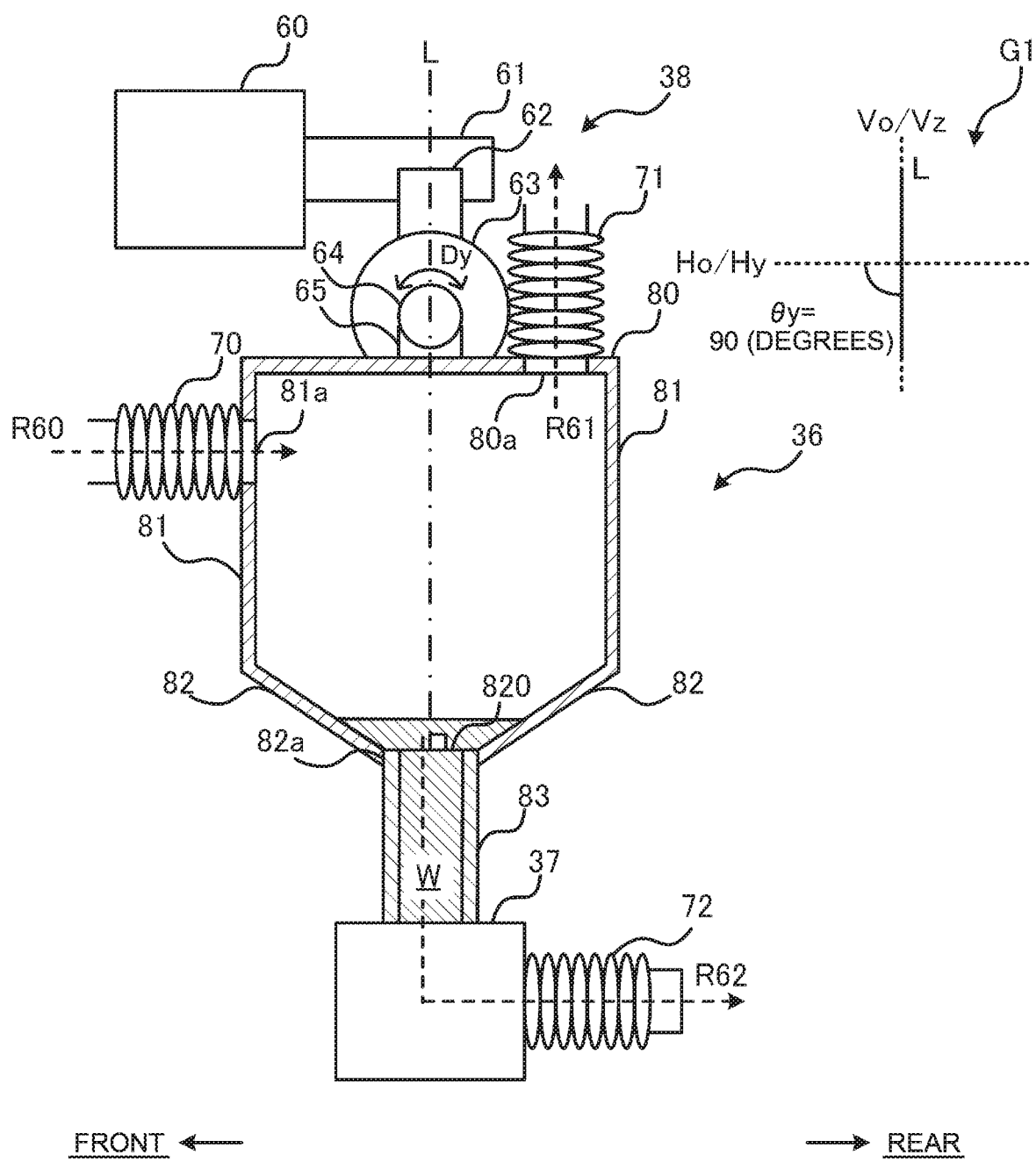
FIG. 14 is a diagram illustrating a structure in which the gas-liquid separator and the anode discharge valve are connected by a straight pipe.

FIG. 14 is a diagram illustrating a structure in which the gas-liquid separator 36 and the anode discharge valve 37 are connected by a straight pipe 83. In FIG. 14, components in common with those in FIG. 3 are represented by the same reference symbols to omit their description.

The pipe 83 extends along the vertical direction Vo between the opening 82a of the gas-liquid separator 36 and the anode discharge valve 37. When the attitude direction L of the gas-liquid separator 36 coincides with the vertical direction Vo, the anode discharge valve 37 is located immediately below the opening 82a as compared to the example illustrated in FIG. 3. Therefore, the water W is likely to flow into the anode discharge valve 37.

As described with reference to FIG. 10 and FIG. 13, the flow of the water W into the anode discharge valve 37 through the opening 82a can be suppressed such that the upper motor 60 and the lower motor 63 control the attitude direction L of the gas-liquid separator 36 depending on the inclination angles Δy and Δx when the fuel cell vehicle 9 is parked.

Operation of ECU 50

Figure 15:
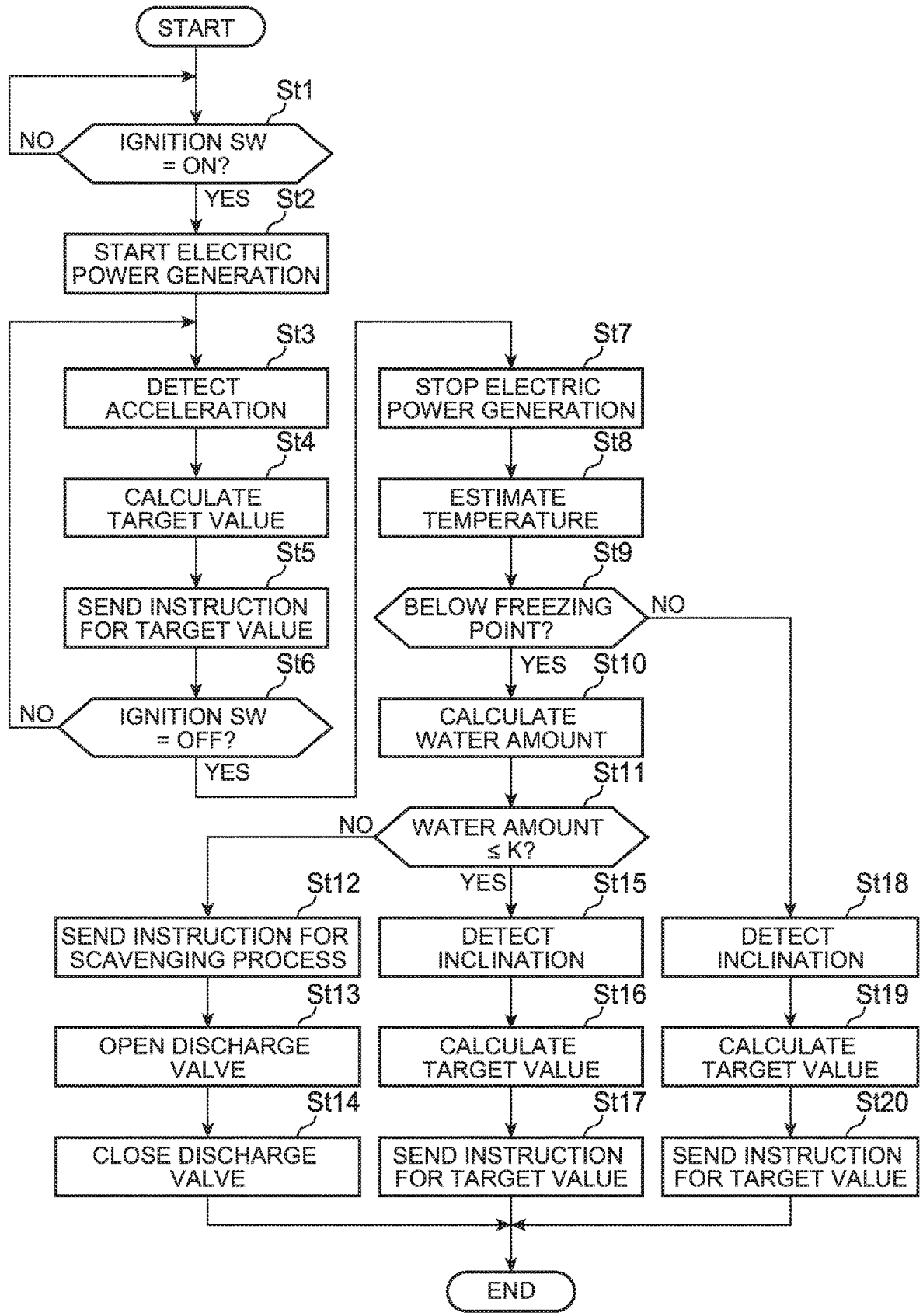
FIG. 15 is a flowchart illustrating an example of an operation of an electronic control unit (ECU).

FIG. 15 is a flowchart illustrating an example of an operation of the ECU 50. The ECU 50 determines whether the ignition switch 54 (SW) is turned ON (Step St1). When the ignition switch 54 is OFF ("No" in Step St1), the process of Step St1 is executed again.

When the ignition switch 54 is ON ("Yes" in Step St1), the ECU 50 starts electric power generation in the FC 10 (Step St2). For example, the ECU 50 sends an instruction for the supply amount of the anode gas to the INJ 33 and an instruction for the supply amount of the cathode gas to the air compressor 20 based on the accelerator operation amount detected by the accelerator operation amount sensor 53.

Next, the ECU 50 causes the acceleration sensors 52a and 52b to detect the accelerations αy and αx in the fore-and-aft direction and the lateral direction of the fuel cell vehicle 9, respectively (Step St3). Next, the ECU 50 calculates target values of the angles θy and θx of the gas-liquid separators 24 and 36 based on the accelerations αy and αx and the gravitational acceleration (Step St4). The target values of the angles θy and θx are calculated by the method described with reference to FIG. 6 and FIG. 8.

Next, the ECU 50 sends instructions for the target values of the angles θy and θx to the attitude control devices 28 and 38 (Step St5). The attitude control devices 28 and 38 control the angles θy and θx to reach their target values.

Next, the ECU 50 determines whether the ignition switch 54 is turned OFF (Step St6). When the ignition switch 54 is still ON ("No" in Step St6), the processes of Step St3 and subsequent steps are executed again.

When the ignition switch 54 is turned OFF ("Yes" in Step St6), the ECU 50 stops the electric power generation in the FC 10 (Step St7). For example, the ECU 50 instructs the INJ 33 to stop supplying the anode gas, and instructs the air compressor 20 to stop supplying the cathode gas.

Next, the ECU 50 estimates the temperatures in the gas-liquid separators 24 and 36 (Step St8). For example, the ECU 50 may compare a temperature change pattern of the temperature sensor 42 with a temperature change pattern of each season, and estimate the temperatures based on a comparison result. At this time, the ECU 50 may determine the latitude and longitude of the fuel cell vehicle 9 by using the Global Positioning System (GPS), and use a temperature change pattern based on the latitude and longitude.

When the ECU 50 determines, as a result of the estimation, that the temperatures in the gas-liquid separators 24 and 36 do not change to temperatures below the freezing point ("No" in Step St9), the ECU 50 causes the inclination sensor 51 to detect the inclination angles Δy and Δx of the fuel cell vehicle 9 (Step St18). Next, the ECU 50 calculates the target values of the angles θy and θx of the gas-liquid separators 24 and 36 depending on the angles Δy and Δx so that the water W is smoothly drained from the openings 82a through the cathode discharge valve 27 and the anode discharge valve 37 (Step St19). The target values of the angles θy and θx are calculated by the method described with reference to FIG. 7.

Next, the ECU 50 sends instructions for the target values of the angles θy and Ox to the attitude control devices 28 and 38 (Step St20). The attitude control devices 28 and 38 control the angles θy and θx to reach their target values.

When the ECU 50 estimates that the temperatures in the gas-liquid separators 24 and 36 do not change to temperatures below the freezing point while the electric power generation in the FC 10 is stopped, the ECU 50 determines the target value of at least one of the angles θy and θx so that the plane 820 of the opening 82a is orthogonal to the vertical direction Vo in each of the gas-liquid separators 24 and 36. When the possibility of freezing of the water in the gas-liquid separators 24 and 36 is low, the attitude control devices 28 and 38 can control the angles θy and θx so that the water smoothly flows into the cathode discharge valve 27 or the anode discharge valve 37 through the opening 82a.

When the ECU 50 determines, as a result of the estimation, that the temperatures in the gas-liquid separators 24 and 36 change to temperatures below the freezing point ("Yes" in Step St9), the ECU 50 calculates water amounts Mca and Man (g) in the gas-liquid separators 24 and 36 on the cathode side and the anode side (Step St10).

$$Man = Nan \times 18 \qquad \text{Expression (1)}$$

$$Mca = Nca \times 18 \qquad \text{Expression (2)}$$

For example, the water amounts Man and Mca are calculated based on Expressions (1) and (2), respectively. The symbol "Nan" represents the number of moles of water vapor in the anode. The symbol "Nca" represents the number of moles of water vapor in the cathode. The water amounts Man and Mca are obtained by multiplying the numbers of moles Nan and Nca by a molecular weight "18" of the water vapor, respectively.

$$Nan = Pan \times Van / R \times T \qquad \text{Expression (3)}$$

$$Nca = Pca \times Vca / R \times T \qquad \text{Expression (4)}$$

For example, the number of moles Nan and Nca are calculated based on Expressions (3) and (4), respectively. Expressions (3) and (4) are equations of state of ideal gas. The symbol "T" represents a coolant temperature detected by the temperature sensor 42 before the electric power generation in the FC 10 is stopped, and the symbol "R" represents a gas constant.

The symbol "Van" represents a sealed volume on the anode side while the electric power generation in the FC 10 is stopped. The sealed volume is a total volume of the anode supply pipe L30 on a downstream side of the INJ 33, the anode gas channel L31, the anode discharge pipe L32, the gas-liquid separator 36, the return pipe L33, and the anode connection pipe L34 on an upstream side of the anode discharge valve 37. The symbol "Vca" represents a sealed volume on the cathode side while the electric power generation in the FC 10 is stopped. The sealed volume is a total volume of the cathode supply pipe and the bypass pipe L24 on a downstream side of the three-way valve 22, the cathode gas channel L21, the gas-liquid separator 24, the cathode discharge pipe L22 on an upstream side of the back pressure regulating valve 25, and the cathode connection pipe L25 on an upstream side of the cathode discharge valve 27. The symbol "Pan" represents a pressure of the sealed portion on the anode side, which is detected by the pressure sensor 39 while the electric power generation in the FC 10 is stopped. The symbol "Pca" represents a pressure of the sealed portion on the cathode side, which is detected by the pressure sensor 29 while the electric power generation in the FC 10 is stopped.

The ECU 50 compares the water amounts Mca and Man with maximum water storage amounts K (g) in the water storage areas 85 or 86 of the gas-liquid separators 24 and 36, respectively (Step St11). The ECU 50 individually compares the water amounts Mca and Man of the gas-liquid separators 24 and 36 with the maximum water storage amounts K, and executes Steps St12 to St17 for each of the gas-liquid separators 24 and 36 based on comparison results.

When the water amount Man (Mca) is larger than the maximum water storage amount K ("No" in Step St11), the ECU 50 instructs the INJ 33 (air compressor 20) to perform the scavenging process (Step St12). The anode gas (cathode gas) is sent as a scavenging gas, and therefore the water W is stored in the gas-liquid separator 36 (24). Next, the ECU 50 opens the anode discharge valve 37 (cathode discharge valve 27) (Step St13). Thus, the water W is drained into the cathode discharge pipe L22 from the gas-liquid separator 36 (24). Next, the ECU 50 closes the anode discharge valve 37 (cathode discharge valve 27) (Step St14).

When the amount of the water in the gas-liquid separator 36 (24) is larger than the maximum water storage amount K of the water storage area 85 or 86, the ECU 50 instructs the INJ 33 (air compressor 20) to perform the scavenging, and opens the anode discharge valve 37 (cathode discharge valve 27). Therefore, an overflow of the water from the water storage area 85 or 86 can be prevented, and the water W in the gas-liquid separator 36 (24) can be drained before frosting. Thus, it is possible to reduce difficulty in draining the water W due to freezing of the anode discharge valve 37 (cathode discharge valve 27).

When the water amount Man (Mca) is equal to or smaller than the maximum water storage amount K ("Yes" in Step St11), the ECU 50 causes the inclination sensor 51 to detect the inclination angles Δy and Δx of the fuel cell vehicle 9 (Step St15). Next, the ECU 50 calculates the target values of the angles θy and θx of the gas-liquid separator 36 (24) depending on the angles Δy and Δx so that the attitude direction L has the reference angles φy and φx with respect to the vertical direction Vo in order to prevent the water W from flowing into the anode discharge valve 37 (cathode discharge valve 27) through the opening 82a (Step St16).

The target values of the angles θy and θx are calculated by the method described with reference to FIG. 9 to FIG. 12.

Next, the ECU 50 sends instructions for the target values of the angles θy and θx to the attitude control devices 28 and 38 (Step St17). The attitude control devices 28 and 38 control the angles θy and θx to reach their target values.

As described above, the ECU 50 calculates the amount of the water W in the gas-liquid separator 24 or 36. When the amount of the water W in the gas-liquid separator 24 or 36 is equal to or smaller than the maximum water storage amount K of the water storage area 85 or 86, the ECU 50 determines the target value of at least one of the angles θy and θx so that the gas-liquid separator 24 or 36 has the reference angle φy or φx with respect to the vertical direction Vo. Therefore, the ECU 50 can control the attitude of the gas-liquid separator 24 or 36 only when the water W does not overflow the water storage area 85 or 86.

The ECU 50 determines the target values of the angles θy and θx depending on the inclination angles Δy and Δx of the fuel cell vehicle 9 that are detected by the inclination sensor 51. Even if the fuel cell vehicle 9 is parked while being inclined, the angles θy and θx of the gas-liquid separators 24 and 36 are appropriately controlled depending on the inclination of the fuel cell vehicle 9.

As described above, the gas-liquid separators 24 and 36 separate water from the cathode off-gas and the anode off-gas discharged from the FC 10, and store the separated water. The water W flowing out through the openings 82a at the bottoms 82 can be drained through the cathode discharge valve 27 and the anode discharge valve 37.

The attitude control devices 28 and 38 control the attitudes of the gas-liquid separators 24 and 36 relative to the fuel cell vehicle 9, respectively. The ECU 50 sends instructions for control targets of the attitudes of the gas-liquid separators 24 and 36 to the attitude control devices 28 and 38. The ECU 50 can adjust the positions of the water W in the gas-liquid separators 24 and 36 based on the control targets of the attitudes of the gas-liquid separators 24 and 36.

The embodiment described above is an exemplary embodiment of the present disclosure. The present disclosure is not limited to the embodiment, but various modifications may be made without departing from the spirit of the present disclosure.

What is claimed is:

1. A fuel cell system to be mounted on a vehicle, the fuel cell system comprising:
   a fuel cell configured to generate electric power through chemical reaction of reactive gases;
   a gas-liquid separator configured to separate water from an off-gas discharged from the fuel cell and store the water that is separated;
   a discharge valve configured to drain the water that has flowed out through an opening at a bottom of the gas-liquid separator;
   an attitude control device configured to control an attitude of the gas-liquid separator relative to the vehicle; and
   an instruction device configured to send an instruction for a control target of the attitude of the gas-liquid separator to the attitude control device.

2. The fuel cell system according to claim 1, wherein the attitude control device is configured to:
   control a first angle of the gas-liquid separator with respect to a fore-and-aft direction of the vehicle such that the first angle reaches a target value of the first angle; and control a second angle of the gas-liquid separator with respect to a lateral direction of the vehicle such that the second angle reaches a target value of the second angle, and the instruction device is configured to send instructions for the target value of the first angle and the target value of the second angle as the control target of the attitude of the gas-liquid separator.

3. The fuel cell system according to claim 1, further comprising an acceleration sensor configured to detect an acceleration of the vehicle, wherein the instruction device is configured to determine the control target of the attitude of the gas-liquid separator based on the acceleration and a gravitational acceleration such that the opening of the gas-liquid separator is inclined in an acceleration direction of the vehicle.

4. The fuel cell system according to claim 3, wherein the instruction device is configured to:

calculate a resultant force of a gravity and a reaction force against an acceleration force of the acceleration; and determine the control target of the attitude of the gas-liquid separator such that a direction of the resultant force with respect to the fore-and-aft direction of the vehicle coincides with a direction orthogonal to a plane of the opening through which the water flows out.

5. The fuel cell system according to claim 1, wherein the instruction device is configured to determine, when the instruction device estimates that a temperature in the gas-liquid separator changes to a temperature below a freezing point while the fuel cell stops generating the electric power, the control target of the attitude of the gas-liquid separator such that the water does not flow out through the opening of the gas-liquid separator.

6. The fuel cell system according to claim 1, wherein the gas-liquid separator has a water storage area where the water is allowed to be stored without flowing out through the opening when the gas-liquid separator has a reference angle with respect to a vertical direction, and the instruction device is configured to determine, when the instruction device estimates that a temperature in the gas-liquid separator changes to a temperature below a freezing point while the fuel cell stops generating the electric power, the control target of the attitude of the gas-liquid separator such that the gas-liquid separator has the reference angle with respect to the vertical direction.

7. The fuel cell system according to claim 6, wherein the instruction device is configured to:

calculate an amount of the water in the gas-liquid separator; and determine, when the amount of the water in the gas-liquid separator is equal to or smaller than a maximum water storage amount of the water storage area, the control target of the attitude of the gas-liquid separator such that the gas-liquid separator has the reference angle with respect to the vertical direction.

8. The fuel cell system according to claim 7, further comprising a scavenging device configured to scavenge the fuel cell by sending the reactive gases, wherein the instruction device is configured to instruct the scavenging device to scavenge the fuel cell and open the discharge valve when the amount of the water in the gas-liquid separator is larger than the maximum water storage amount.

9. The fuel cell system according to claim 5, further comprising an inclination sensor configured to detect an inclination of the vehicle, wherein the instruction device is configured to determine the control target of the attitude of the gas-liquid separator depending on the inclination of the vehicle.

10. The fuel cell system according to claim 1, wherein the instruction device is configured to determine, when the instruction device estimates that a temperature in the gas-liquid separator does not change to a temperature below a freezing point while the fuel cell stops generating the electric power, the control target of the attitude of the gas-liquid separator such that a plane of the opening through which the water flows out is orthogonal to a vertical direction.

11. The fuel cell system according to claim 1, wherein the gas-liquid separator includes:

an inlet of the off-gas discharged from the fuel cell; and an outlet of the off-gas to be circulated through the fuel cell, and flexible pipes are connected to the inlet, the outlet, and a downstream side of the discharge valve.

* * * * *